` `(12) United States Patent (10) Patent No.: US 9,354,377 B2
York et al. (45) Date of Patent: May 31, 2016

(54) LIGHT GUIDE ILLUMINATION DEVICE WITH LIGHT DIVERGENCE MODIFIER

(71) Applicant: Quarkstar LLC, Las Vegas, NV (US)

(72) Inventors: Allan Brent York, Langley (CA); Louis Lerman, Las Vegas, NV (US); Ferdinand Schinagl, North Vancouver (CA); Wilson Dau, Calgary (CA); Hans Peter Stormberg, Stolberg (DE)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 14/418,887

(22) PCT Filed: Sep. 17, 2014

(86) PCT No.: PCT/US2014/056132
§ 371 (c)(1),
(2) Date: Jan. 30, 2015

(87) PCT Pub. No.: WO2015/042174
PCT Pub. Date: Mar. 26, 2015

(65) Prior Publication Data
US 2015/0301260 A1  Oct. 22, 2015

Related U.S. Application Data

(60) Provisional application No. 61/878,764, filed on Sep. 17, 2013.

(51) Int. Cl.
*F21V 7/04* (2006.01)
*F21V 8/00* (2006.01)
(Continued)

(52) U.S. Cl.
CPC ............ *G02B 6/0035* (2013.01); *F21V 7/0016* (2013.01); *F21V 7/0091* (2013.01);
(Continued)

(58) Field of Classification Search
CPC .. G02B 6/0008; G02B 6/0011; G02B 6/0023; G02B 6/0033; G02B 6/0035; G02B 6/0068; G02B 6/0073; G02B 6/005; G02B 6/26; G02B 6/262; G02B 6/0013; G02B 6/0031; G02B 6/0045; G02B 6/0051; F21V 5/00; F21V 7/0016; F21V 7/0025; F21V 7/0033; F21V 7/00; F21V 7/0091; F21Y 2101/02; F21Y 2103/003
USPC ............... 362/231, 249.01, 249.02, 308, 511, 362/545, 551, 554, 555, 558, 607
See application file for complete search history.

(56) References Cited

U.S. PATENT DOCUMENTS 2,194,841 A  3/1940 Welch
2,626,120 A  1/1953 Baker
(Continued)

FOREIGN PATENT DOCUMENTS

CA  2 702 690  11/2010
DE  199 17 401  10/2000
(Continued)

OTHER PUBLICATIONS

Notification of Transmittal of the International Search Report and the Written Opinion of the International Searching Authority, International Application No. PCT/US2014/056132, mailed Dec. 8, 2014, 9 pages.
(Continued)

*Primary Examiner* — Hargobind S Sawhney
(74) *Attorney, Agent, or Firm* — Fish & Richardson PC

(57) ABSTRACT

An illumination device includes a light-emitting element (LEEs); a light guide extending in a forward direction from a first end to a second end to receive at the first end LEE light and to guide the light to the second end, such that divergence of the light received at the first end and divergence of the guided light that reaches the second end are substantially the same; a light divergence modifier optically coupled to the light guide at the second end to receive the guided light, to modify the divergence of the guided light, such that the light provided by the light divergence modifier has a modified divergence different from the divergence of the guided light; and an optical extractor optically coupled to the light divergence modifier, to output into the ambient environment light provided by the light divergence modifier as output light in one or more output angular ranges.

21 Claims, 8 Drawing Sheets

(51) Int. Cl.
*F21V 7/00* (2006.01)
*F21Y 101/02* (2006.01)
*F21Y 103/00* (2016.01)

(52) U.S. Cl.
CPC ............ *G02B 6/005* (2013.01); *G02B 6/0031* (2013.01); *G02B 6/0045* (2013.01); *G02B 6/0055* (2013.01); *F21Y 2101/02* (2013.01); *F21Y 2103/003* (2013.01)

(56) References Cited

U.S. PATENT DOCUMENTS

| | | | |
|---|---|---|---|
| 3,772,506 A | 11/1973 | Junginger | |
| 3,836,767 A | 9/1974 | Lasker | |
| 4,112,483 A | 9/1978 | Small et al. | |
| 4,240,692 A | 12/1980 | Winston | |
| 4,254,456 A | 3/1981 | Grindle et al. | |
| 4,271,408 A | 6/1981 | Teshima et al. | |
| 4,358,817 A | 11/1982 | Bielemeier | |
| 4,765,718 A * | 8/1988 | Henkes | G02F 1/133524 349/57 |
| 5,075,827 A | 12/1991 | Smith | |
| 5,134,550 A | 7/1992 | Young | |
| 5,181,265 A * | 1/1993 | Nishiwaki | G02B 6/34 349/193 |
| 5,289,356 A | 2/1994 | Winston | |
| 5,436,805 A | 7/1995 | Hsu et al. | |
| 5,438,485 A | 8/1995 | Li et al. | |
| 5,440,658 A * | 8/1995 | Savage, Jr. | G02B 6/32 385/79 |
| 5,764,828 A * | 6/1998 | Iga | G01B 11/255 385/31 |
| 5,810,463 A | 9/1998 | Kawahara et al. | |
| 5,868,489 A | 2/1999 | Fuller et al. | |
| 5,988,836 A | 11/1999 | Sawarens | |
| 6,058,271 A | 5/2000 | Tenmyo | |
| 6,234,643 B1 | 5/2001 | Lichon | |
| 6,241,369 B1 | 6/2001 | Mackiewicz | |
| 6,273,577 B1 | 8/2001 | Goto et al. | |
| 6,350,041 B1 | 2/2002 | Tarsa et al. | |
| 6,428,216 B1 * | 8/2002 | Savage, Jr. | G02B 6/4219 385/33 |
| 6,441,943 B1 | 8/2002 | Roberts et al. | |
| 6,505,953 B1 | 1/2003 | Dahlen | |
| 6,527,420 B1 | 3/2003 | Chuang | |
| 6,540,373 B2 | 4/2003 | Bailey | |
| 6,543,911 B1 | 4/2003 | Rizkin et al. | |
| 6,572,246 B1 | 6/2003 | Hopp et al. | |
| 6,598,998 B2 | 7/2003 | West et al. | |
| 6,779,929 B1 * | 8/2004 | Savage, Jr. | G02B 6/322 385/88 |
| 6,834,979 B1 | 12/2004 | Cleaver et al. | |
| 6,880,963 B2 | 4/2005 | Luig et al. | |
| 6,932,499 B2 | 8/2005 | Ogura | |
| 7,083,315 B2 | 8/2006 | Hansler et al. | |
| 7,097,337 B2 | 8/2006 | Kim et al. | |
| 7,156,540 B2 | 1/2007 | Haines | |
| 7,164,842 B2 | 1/2007 | Chen | |
| 7,182,480 B2 | 2/2007 | Kan | |
| 7,259,403 B2 | 8/2007 | Shimizu et al. | |
| 7,275,841 B2 | 10/2007 | Kelly | |
| 7,286,296 B2 | 10/2007 | Chaves et al. | |
| 7,290,906 B2 | 11/2007 | Suzuki et al. | |
| 7,293,889 B2 | 11/2007 | Kamiya | |
| 7,331,691 B2 | 2/2008 | Livesay et al. | |
| 7,334,932 B2 | 2/2008 | Klettke | |
| 7,341,358 B2 | 3/2008 | Hsieh et al. | |
| 7,386,214 B1 | 6/2008 | Canciotto | |
| 7,387,399 B2 | 6/2008 | Noh et al. | |
| 7,434,951 B2 | 10/2008 | Bienick | |
| 7,530,712 B2 | 5/2009 | Lin et al. | |
| 7,645,054 B2 | 1/2010 | Goihl | |
| 7,850,347 B2 | 12/2010 | Speier et al. | |
| 7,855,815 B2 | 12/2010 | Hayashide et al. | |
| 7,942,546 B2 | 5/2011 | Naijo et al. | |
| 7,942,562 B2 * | 5/2011 | Hatzenbuehler | B60Q 3/005 362/551 |
| 7,947,915 B2 | 5/2011 | Lee et al. | |
| 7,967,477 B2 | 6/2011 | Bloemen et al. | |
| 7,988,305 B2 * | 8/2011 | Itoh | G02B 27/0994 353/94 |
| 8,002,446 B1 | 8/2011 | Plunk et al. | |
| 8,006,453 B2 | 8/2011 | Anderson | |
| 8,042,968 B2 | 10/2011 | Boyer et al. | |
| 8,061,867 B2 | 11/2011 | Kim et al. | |
| 8,068,707 B1 | 11/2011 | Simon | |
| 8,075,147 B2 | 12/2011 | Chaves et al. | |
| 8,192,051 B2 | 6/2012 | Dau et al. | |
| 8,348,489 B2 | 1/2013 | Holman et al. | |
| 8,573,823 B2 | 11/2013 | Dau | |
| 8,740,407 B2 | 6/2014 | Kotovsky et al. | |
| 2003/0117798 A1 | 6/2003 | Leysath | |
| 2004/0012976 A1 | 1/2004 | Amano | |
| 2004/0080947 A1 | 4/2004 | Subisak et al. | |
| 2004/0105264 A1 | 6/2004 | Spero | |
| 2004/0120160 A1 | 6/2004 | Natsume | |
| 2004/0137189 A1 | 7/2004 | Tellini et al. | |
| 2004/0208019 A1 | 10/2004 | Koizumi | |
| 2004/0228131 A1 | 11/2004 | Minano et al. | |
| 2004/0257803 A1 | 12/2004 | Kermoade | |
| 2005/0057922 A1 | 3/2005 | Herst et al. | |
| 2005/0063169 A1 | 3/2005 | Erber | |
| 2005/0111235 A1 | 5/2005 | Suzuki et al. | |
| 2005/0185416 A1 | 8/2005 | Lee et al. | |
| 2005/0207177 A1 | 9/2005 | Guy | |
| 2005/0243570 A1 | 11/2005 | Chaves et al. | |
| 2005/0265044 A1 | 12/2005 | Chen et al. | |
| 2005/0270774 A1 | 12/2005 | Pan | |
| 2006/0061990 A1 | 3/2006 | Chinniah et al. | |
| 2006/0076568 A1 | 4/2006 | Keller et al. | |
| 2006/0098444 A1 | 5/2006 | Petruzzi | |
| 2006/0139917 A1 | 6/2006 | Ward | |
| 2006/0164839 A1 | 7/2006 | Stefanov | |
| 2006/0187661 A1 | 8/2006 | Holten | |
| 2007/0047228 A1 | 3/2007 | Thompson et al. | |
| 2007/0061360 A1 | 3/2007 | Holcombe et al. | |
| 2007/0081360 A1 | 4/2007 | Bailey | |
| 2007/0097696 A1 | 5/2007 | Eng et al. | |
| 2007/0201234 A1 | 8/2007 | Ottermann | |
| 2007/0280593 A1 | 12/2007 | Brychell et al. | |
| 2008/0074752 A1 | 3/2008 | Chaves et al. | |
| 2008/0080166 A1 | 4/2008 | Duong et al. | |
| 2008/0170398 A1 | 7/2008 | Kim | |
| 2008/0192458 A1 | 8/2008 | Li | |
| 2008/0198603 A1 | 8/2008 | Sormani et al. | |
| 2009/0103293 A1 | 4/2009 | Harbers et al. | |
| 2009/0168395 A1 | 7/2009 | Mrakovich et al. | |
| 2009/0201698 A1 | 8/2009 | Klick et al. | |
| 2009/0231831 A1 | 9/2009 | Hsiao | |
| 2009/0231878 A1 | 9/2009 | Van Duijneveldt | |
| 2009/0316414 A1 | 12/2009 | Yang | |
| 2010/0085773 A1 | 4/2010 | Richardson | |
| 2010/0220497 A1 | 9/2010 | Ngai | |
| 2011/0063870 A1 | 3/2011 | Nomoto et al. | |
| 2011/0103067 A1 | 5/2011 | Ago et al. | |
| 2011/0164398 A1 | 7/2011 | Holten et al. | |
| 2011/0175533 A1 | 7/2011 | Holman et al. | |
| 2011/0182084 A1 | 7/2011 | Tomlinson | |
| 2011/0199005 A1 | 8/2011 | Bretschneider et al. | |
| 2011/0227487 A1 | 9/2011 | Nichol et al. | |
| 2011/0234121 A1 | 9/2011 | Ding et al. | |
| 2011/0235318 A1 | 9/2011 | Simon | |
| 2011/0267836 A1 | 11/2011 | Boonekamp et al. | |
| 2011/0273900 A1 | 11/2011 | Li et al. | |
| 2011/0286200 A1 | 11/2011 | Iimura | |
| 2012/0020066 A1 | 1/2012 | Chang | |
| 2012/0044675 A1 | 2/2012 | Buelow et al. | |
| 2012/0069595 A1 | 3/2012 | Catalano | |
| 2012/0099310 A1 | 4/2012 | Kropac et al. | |
| 2012/0147624 A1 | 6/2012 | Li et al. | |
| 2012/0155110 A1 | 6/2012 | Pijlman et al. | |
| 2012/0155116 A1 | 6/2012 | Gardner | |
| 2012/0170260 A1 | 7/2012 | Gardner | |
| 2012/0236586 A1 | 9/2012 | Wang | |

(56) References Cited

U.S. PATENT DOCUMENTS

| | | |
|---|---|---|
| 2012/0250346 A1 | 10/2012 | Williams |
| 2012/0268966 A1 | 10/2012 | McCollum et al. |
| 2012/0281432 A1 | 11/2012 | Parker et al. |
| 2012/0294037 A1 | 11/2012 | Holman et al. |
| 2013/0039090 A1 | 2/2013 | Dau |
| 2013/0208495 A1 | 8/2013 | Dau |
| 2013/0272015 A1 | 10/2013 | Weaver |

FOREIGN PATENT DOCUMENTS

| | | |
|---|---|---|
| DE | 10 2011 001769 | 10/2012 |
| EP | 1 182 395 | 2/2002 |
| EP | 2 163 701 | 3/2010 |
| EP | 2 196 725 | 6/2010 |
| EP | 2 264 359 | 12/2010 |
| EP | 2 439 564 | 4/2012 |
| FR | 2784739 | 4/2000 |
| FR | 2934353 | 1/2010 |
| WO | WO 01/07828 | 2/2001 |
| WO | WO03009012 A3 | 5/2003 |
| WO | WO 2005/073629 | 8/2005 |
| WO | WO 2005/090854 | 9/2005 |
| WO | WO 2008/007315 | 1/2008 |
| WO | WO 2008/047278 | 4/2008 |
| WO | WO 2008/139383 | 11/2008 |
| WO | WO 2009/105168 | 8/2009 |
| WO | WO 2010/079391 | 7/2010 |
| WO | WO2010113091 A1 | 10/2010 |
| WO | WO 2011/112914 | 9/2011 |
| WO | WO 2012/093126 | 7/2012 |
| WO | WO 2012/131560 | 10/2012 |
| WO | WO2012176352 A1 | 12/2012 |
| WO | WO2013023008 A1 | 2/2013 |
| WO | WO 2013/066822 | 5/2013 |
| WO | WO 2013/154835 | 10/2013 |

OTHER PUBLICATIONS

Authorized Officer Blaine R. Copenheaver, Notification of Transmittal of the International Search Report and the Written Opinion of the International Searching Authority, International Application No. PCT/US2013/059416, mailed Feb. 19, 2014, 9 pages.

Authorized Officer Blaine R. Copenheaver, Notification of Transmittal of the International Search Report and the Written Opinion of the International Searching Authority, International Application No. PCT/US2014/015255, mailed May 19, 2014, 12 pages.

Authorized Officer Shane Thomas, Notification of Transmittal of International Search Report and Written Opinion, International Application No. PCT/US14/15707, mailed May 29, 2014, 21 pages.

Authorized Officer Shane Thomas, Notification of Transmittal of International Search Report and Written Opinion, International Application No. PCT/US14/27583, mailed Jul. 24, 2014, 12 pages.

Supplementary European Search Report for European Patent Application No. 12822822.8, mailed Jul. 4, 2014, 3 pages.

Thomas, "International Search Report and Written Opinion" from co-pending PCT Application No. PCT/US13/24525 dated Apr. 16, 2013, 16 pages.

Young, "International Search Report and Written Opinion" from co-pending PCT Application No. PCT/US12/50046 dated Oct. 26, 2012, 34 pages.

http://www.everlight.com/datasheets/OL-Flat_Series_Data_Sheet_v5.pdf, "Datasheet: Office Lighting Flat Luminaire Series", product catalog, Everlight, Issue No. DBM-0000054_v5, May 5, 2011, pp. 1-5.

Philips Lighting Company, "Philips EnduraLED Candle LED Lamps", Downloaded from the internet at: www.lighting.philips.com/us_en/browseliterature/download/p-6027 on Jan. 27, 2012, 2 pages (2010).

* cited by examiner

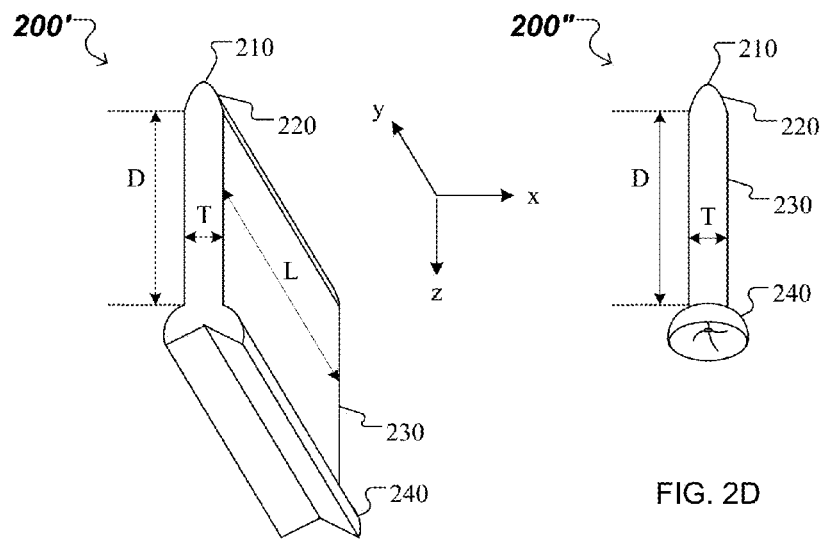
FIG. 2C
FIG. 2D
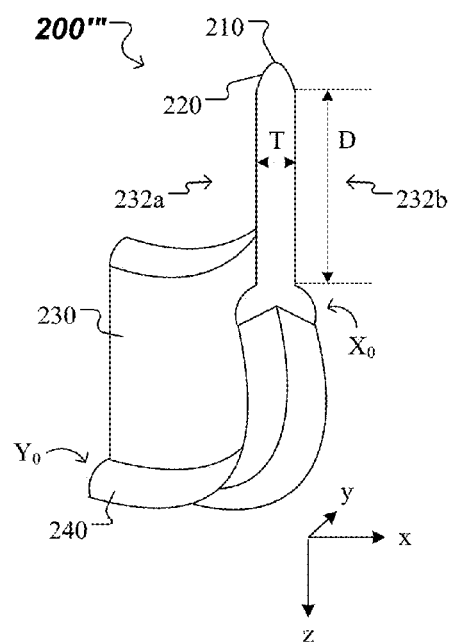
FIG. 2E
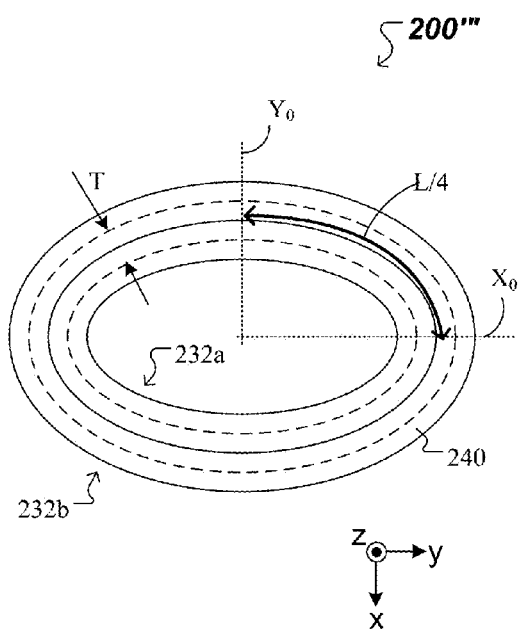
FIG. 2F

LIGHT GUIDE ILLUMINATION DEVICE WITH LIGHT DIVERGENCE MODIFIER

CROSS-REFERENCE TO RELATED APPLICATION

This application is a U.S. National Stage of International Application No. PCT/US2014/056132, filed Sep. 17, 2014, which claims benefit under 35 U.S.C. §119(e)(1) of U.S. Provisional Application No. 61/878,764, filed on Sep. 17, 2013, the entire contents of which are incorporated by reference herein.

TECHNICAL FIELD

The present disclosure relates to illumination devices having a combination of a light guide and a light divergence modifier.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to illumination devices that include a combination of a light guide and a light divergence modifier.

In general, innovative aspects of the technologies described herein can be implemented in an illumination device that includes one or more of the following aspects:

In one aspect, an illumination device includes a plurality of light-emitting elements (LEEs); a light guide extending in a forward direction from a first end of the light guide to a second end of the light guide, the light guide being positioned to receive at the first end light emitted by the LEEs and configured to guide the light to the second end, wherein divergence of the light received at the first end and divergence of the guided light that reaches the second end are substantially the same; a light divergence modifier optically coupled to the light guide at the second end to receive the guided light, the light divergence modifier configured to modify the divergence of the guided light, such that the light provided by the light divergence modifier has a modified divergence different from the divergence of the guided light; and an optical extractor optically coupled to the light divergence modifier, the optical extractor configured to output into the ambient environment light provided by the light divergence modifier as output light in one or more output angular ranges.

The foregoing and other embodiments can each optionally include one or more of the following features, alone or in combination. In some implementations, the light divergence modifier can be tapered such that an input aperture of the light divergence modifier is larger than an output aperture of the light divergence modifier, and the modified divergence of the light provided—at the output aperture of the light divergence modifier—to the optical extractor is larger than the divergence of the guided light. In other implementations, the light divergence modifier can be flared such that an input aperture of the light divergence modifier is smaller than an output aperture of the light divergence modifier, and the modified divergence of the light provided—at the output aperture of the light divergence modifier—to the optical extractor is smaller than the divergence of the guided light. In either of the foregoing implementations, the light divergence modifier can include a pair of opposing side surfaces extending along a length of the light divergence modifier between the input aperture and the output aperture. In some cases, at least one of the opposing side surfaces is planar. In some other cases, both of the opposing side surfaces are planar. Alternatively, the light divergence modifier can include a truncated conical shaped surface extending between the input aperture and the output aperture.

In some implementations, the light divergence modifier is configured to guide the light received at the input aperture in the forward direction through total internal reflection (TIR) at the opposing side surfaces.

In some implementations, the light divergence modifier can include a 3D grating extending along a length of the light divergence modifier, the 3D grating configured such that the modified divergence of the light provided—at the output aperture of the light divergence modifier—to the optical extractor is smaller than the divergence of the guided light. In some implementations, the light divergence modifier can include a 3D grating extending along a length of the light divergence modifier, the 3D grating configured such that the modified divergence of the light provided—at the output aperture of the light divergence modifier—to the optical extractor is larger than the divergence of the guided light.

In either of the foregoing implementations, the length of the light divergence modifier is a fraction of a length of the light guide. For example, the fraction is between 5% and 50%. Further, the 3D grating can include one or more of a holographic element and a photonic crystal.

In some implementations, the light divergence modifier comprises a convergent lens configured such that the modified divergence of the light provided to the optical extractor is smaller than the divergence of the guided light. In other implementations, the light divergence modifier comprises a divergent lens configured such that the modified divergence of the light provided to the optical extractor is larger than the divergence of the guided light. Here, an index of refraction associated with the lens is different from an index of refraction associated with the light guide and an index of refraction associated with the optical extractor. In some cases, the lens can be a Fresnel lens.

In either of the foregoing implementations, the light guide, the light divergence modifier and the optical extractor can be integrally formed or bonded together.

In some implementations, the light divergence modifier can include an optical interface configured as a 2D grating, the 2D grating configured such that the modified divergence of the light provided to the optical extractor is smaller than the divergence of the guided light. In some implementations, the light divergence modifier can include an optical interface configured as a 2D grating, the 2D grating configured such that the modified divergence of the light provided to the optical extractor is larger than the divergence of the guided light.

In some implementations, the light guide can be configured to guide the light received at the first end in the forward direction through total internal reflection (TIR) off the opposing side surfaces. In some implementations, the light provided by the LEEs has a first divergence, and a numerical aperture of the light guide is such that the light received from the LEEs with the first divergence can be guided by the light guide through TIR off the pair of opposing side surfaces.

In some implementations, the disclosed luminaire module can further include one or more optical couplers. Here, the light provided by the LEEs has a first divergence, the optical couplers are arranged to receive the light provided by the LEEs and redirect it to the receiving end of the light guide with a second divergence, and a numerical aperture of the light guide is such that the light received from the optical couplers with the second divergence can be guided by the light guide through TIR off the pair of opposing side surfaces.

In some implementations, the LEEs can be LEDs that emit white light. In some implementations, the optical extractor can include at least one redirecting surface, the at least one redirecting surface of the optical extractor being adapted to reflect at least a portion of the light provided by the light divergence modifier in a direction that has a component orthogonal to the forward direction. In some implementations, the optical extractor can include a first redirecting surface adapted to reflect at least a portion of the light provided by the light divergence modifier in a first direction that has a component orthogonal to the forward direction; and a second redirecting surface adapted to reflect at least a portion of the light provided by the light divergence modifier in a second direction that has a component orthogonal to the forward direction and antiparallel to the orthogonal component of the first direction. In either of the foregoing implementations, the first redirecting surface and/or the second redirecting surface can transmit a remaining portion of the light provided by the light divergence modifier so that the transmitted portion of the light exits the optical extractor to the ambient environment in the forward direction. Moreover, the optical extractor can include a first curved output surface and/or a second curved output surface positioned in a path(s) of the light reflected from the first redirecting surface and/or the second redirecting surface, and the first curved output surface and/or the second curved output surface are configured to transmit light incident thereon to the ambient environment in one or more backward angular ranges.

In some implementations, the disclosed luminaire module can extend orthogonally to the forward direction. Here, the LEEs are arranged orthogonally to the forward direction.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIGS. 2A-2F show aspects of example luminaire modules that include a combination of a light guide and a light divergence modifier.

Reference numbers and designations in the various drawings indicate exemplary aspects, implementations of particular features of the present disclosure.

DETAILED DESCRIPTION

The present disclosure relates to illumination devices for providing direct and/or indirect illumination. The disclosed illumination devices can efficiently guide and distribute light emitted by solid-state light sources towards work surfaces and/or towards background regions. Various luminous surfaces of the disclosed illumination devices and their respective intensity vectors can be manipulated within an illuminated environment to provide good utility of the light distribution output by the disclosed illumination devices. The present technology can harness the collective output of a plurality of solid-state light sources and create a virtual light source with unique properties that can result in compact luminaires with a small physical footprint relative to the illuminated environment.

Here, the light from the solid-state light sources is received at an input end of a light guide and guided to an output end. The guided light at the output end of the light guide can have the same or different (within measurement error) divergence compared to the light received at the input end of the light guide. An optical element, referred to herein as a light divergence modifier, is disposed between the light guide and an optical extractor of the disclosed illumination devices. In this manner, the light divergence modifier receives the guided light and modifies the divergence of the guided light such that light provided by the light divergence modifier to the optical extractor has a modified divergence that is different from the divergence of the guided light.

Figure 1A:
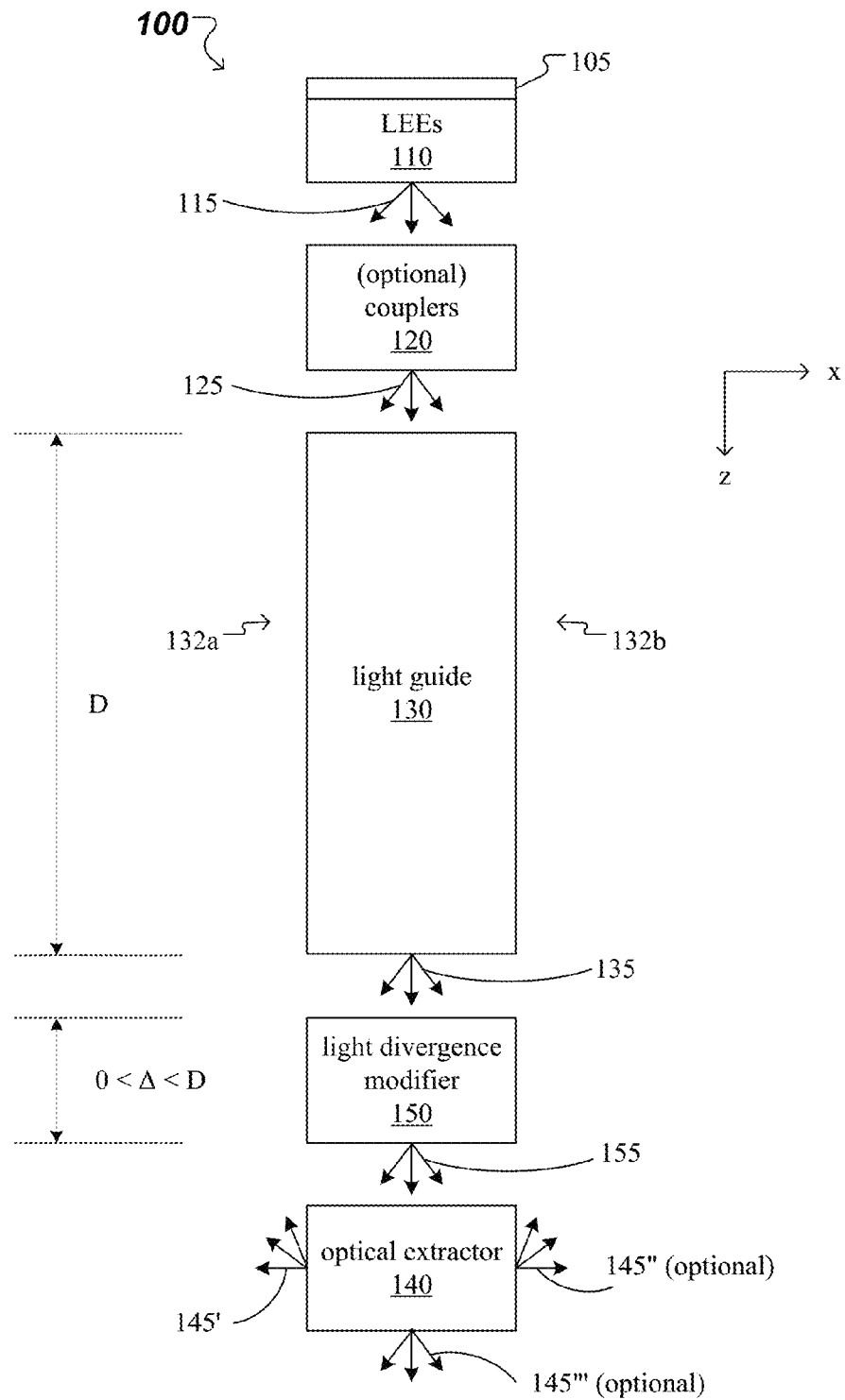
FIG. 1A shows an example of a luminaire module that includes a combination of a light guide and a light divergence modifier.

(i) Illumination Device with a Combination of a Light Guide and a Light Divergence Modifier FIG. 1A illustrates a block diagram of an illumination device 100 that includes a combination of a light guide 130 and a light divergence modifier 150. The illumination device 100, referred to as luminaire module 100, further includes one or more light emitting elements (LEEs) 110, an optical extractor 140. The LEEs 110 can be disposed on a substrate 105. In some implementations, the illumination device 100 further includes one or more couplers 120.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have a Lambertian distribution relative to the optical axes of the one or more LEEs 110 (e.g., the z-axis of the Cartesian reference system shown in FIG. 1A.) As used herein, providing light in an "angular range" refers to providing light that propagates in one or more directions having a divergence with respect to a corresponding prevalent direction of propagation. In this context, the term "prevalent direction of propagation" refers to a direction along which all or a portion of an intensity distribution of the propagating light has a maximum, a mean, a median or other defined direction, for example. For example, the prevalent direction of propagation associated with the angular range can be an orientation of a lobe of the intensity distribution. (See, e.g., FIG. 1B.) Also in this context, the term "divergence" refers to a solid angle outside of which the intensity distribution of the propagating light drops below a predefined fraction of the intensity in the prevalent direction of the intensity distribution. For example, the divergence associated with the angular range can be the width of the lobe of the intensity distribution. The predefined fraction can be 10%, 5%, 1%, or other portion of the maximum intensity, depending on the lighting application.

The light guide 130 can be made from a solid, transparent material. The light guide 130 is arranged to receive the light provided by the LEEs 110 at one end of the light guide 130 and to guide the received light in a forward direction, e.g., along the z-axis, from the receiving end to an opposing end of the light guide 130. Here, a distance D between the receiving end of the light guide 130 and its opposing end can be 5, 10, 20, 50 or 100 cm, for instance. A combination of (i) an angular range in which the light is received by the light guide 130 at the receiving end and (ii) a numerical aperture of the light guide 130 is configured such that the received light is guided from the receiving end to the opposing end through reflection off of light guide side surfaces 132a, 132b of the light guide 130. Depending on the implementation, at least some, if not all, of this reflection is via total internal reflection (TIR). In some implementations, the numerical aperture of the light guide 130 is such that all light provided by the LEEs 110 in the angular range 115 can be injected directly into the light guide 130 at its receiving end.

In other implementations, the luminaire module 100 includes one or more couplers 120 to receive the light from the LEEs 110 within the first angular range 115 and provide light within a second angular range 125 to the receiving end of the light guide 130. The one or more couplers 120 are shaped to transform the first angular range 115 into the second angular range 125 via total internal reflection, specular reflection or both. As such, the one or more couplers 120 can include a solid transparent material for propagating light from an input end to an output end of each of the one or more couplers 120. Here, the divergence of the second angular range 125 is smaller than the divergence of the first angular range 115, such that all light provided by the couplers 120 in the angular range 125 can be injected into the light guide 130 at its receiving end.

One or more of the light guide side surfaces 132a, 132b can be planar, curved or otherwise shaped. The light guide side surfaces 132a, 132b can be parallel or non-parallel. In embodiments with non-parallel light guide side surfaces 132a, 132b, a third angular range 135 of the guided light at the opposing end of the light guide 130 is different than the angular range 115 (when the light guide 130 receives the light directly from the LEEs 110) or 125 (when the light guide 130 receives the light from the couplers 120) of the light received at the receiving end. Here, the light guide side surfaces 132a, 132b can be optically smooth to allow for the guided light to propagate forward (e.g., in the positive direction of the z-axis) inside the light guide 130 through TIR. In this case, the light guide side surfaces 132a, 132b are shaped and arranged with respect to the z-axis and each other such that the guided light impinges on the light guide side surfaces 132a, 132b at incident angles larger than a critical angle over the entire distance D—from the input end the output end of the light guide 130. In embodiments with parallel light guide side surfaces 132a, 132b, whether the light guide 130 is solid or hollow, the third angular range 135 of the guided light at the opposing end of the light guide 130 has at least substantially the same divergence as the angular range 115 (when the light guide 130 receives the light directly from the LEEs 110) or 125 (when the light guide 130 receives the light directly from the couplers 120) of the light received at the receiving end.

Additionally, the length D of the light guide 130 (along the z-axis), a width L (along the y-axis) and a thickness T (along the x-axis) are designed to homogenize the light emitted by the discrete LEEs 110—which are distributed along the y-axis—as it is guided from the receiving end to the opposing end of the light guide 130. In this manner, the homogenizing of the emitted light—as it is guided through the light guide 130—causes a change of a discrete profile along the y-axis of the first angular range 115 (when the light guide 130 receives the light directly from the LEEs 110) or the second angular range 125 (when the light guide 130 receives the light from the couplers 120) to a continuous profile along the y-axis of the third angular range 135 in which the discrete profile is partially or fully blurred.

The light divergence modifier 150 is disposed between the output end of the light guide 130 and the optical extractor 140. In some implementations, the light divergence modifier 150 extends from an input aperture to an output aperture over a distance $\Delta$. The distance $\Delta$ represents a length of the light divergence modifier 150 and it is finite ($\Delta$>0) but less than the depth D of the light guide 130, as described below in connection with FIGS. 3A-3E and 4B.

In some implementations, the length $\Delta$ of the light divergence modifier 150 is between $0.05D \leq \Delta \leq 0.5D$, e.g., 0.1D, 0.2D, 0.3D, or 0.4D. In some cases, the light divergence modifier 150 is made from a solid, transparent material. For example, the light divergence modifier material has the same refractive index as the light guide material or as the optical extractor material. As another example, the light divergence modifier material has a refractive index different from at least one of refractive indices of the light guide material and the optical extractor material. In the latter example, either the light guide 130 or the optical extractor 140 or both also is/are hollow. In other cases, the finite-length light divergence modifier 150 is hollow. In such cases, either the light guide 130 or the optical extractor 140 or both also is/are hollow.

In other implementations, the light divergence modifier 150 is configured as an interfacial light divergence modifier which includes an optical interface between the light guide 130 and the optical extractor 140. Here, the foregoing optical interface is engineered (as described below in connection with FIG. 4A) to modify the angular range 135 of the guided light. In the latter case, the length $\Delta$ of the light divergence modifier 150 collapses to zero, $\Delta \rightarrow 0$.

The guided light provided at the output end of the light guide 130 with a guided angular range 135 is received by the light divergence modifier 150 at the input aperture. The light divergence modifier 150 is configured to modify the angular range 135 of the received guided light such that light provided by the light divergence modifier 150 at the output aperture has a modified angular range 155. In this manner, a divergence of the modified angular range 155 is different from a divergence of the guided angular range 135, or equivalently, the divergence of the modified light provided by the light divergence modifier 150 to the optical extractor 140 is different from the divergence of the guided light received by the light divergence modifier 150 from the light guide 130.

The optical extractor 140 outputs into the ambient environment the light with modified angular range 155 received from the light divergence modifier 150 as output light in one or more output angular ranges. As such, the light output by the extractor 140 has a first output angular range 145' that can be substantially continuous along the y-axis and has a first output propagation direction with a component opposite to the forward direction (e.g., antiparallel to the z-axis.) In some implementations, the light output by the extractor 140 has, in addition to the first output angular range 145', a second output angular range 145" that is substantially continuous along the y-axis and has a second output propagation direction with a component opposite to the forward direction (e.g., antiparallel to the z-axis.) In this case, the first output propagation direction and the second output propagation direction have respective components orthogonal to the forward direction that are opposite (antiparallel) to each other (e.g., antiparallel and parallel to the x-axis.) In some implementations, the light output by the extractor 140 has, in addition to the first output angular range 145' and the second output angular range 145", a third output angular range 145'" that can be substantially continuous along the y-axis and has a third output propagation direction along the forward direction (e.g., along the z-axis.)

As described above, the light guide 130 and the optical extractor 140 of illumination device 100 are arranged and configured to translate and redirect light emitted by LEEs 110 away from the LEEs before the light is output into the ambient environment. The spatial separation of the place of generation of the light, also referred to as the physical (light) source, from the place of extraction of the light, also referred to as a virtual light source or a virtual filament, can facilitate design of the illumination device 100. In this manner, a virtual filament can be configured to provide substantially non-isotropic light emission with respect to planes parallel to an optical axis of the illumination device (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 110, with their predetermined optical, thermal, electrical and mechanical constraints, from the place of light extraction, may facilitate a greater degree of design freedom of the illumination device 100 and allows for an extended optical path, which can permit a predetermined level of light mixing before light is output from the illumination device 100.

Moreover, the use of a light divergence modifier 150 in the illumination device 100 to modify divergence of the light guided by the light guide 130 prior to providing it to the optical extractor 140 is advantageous for cases when near field and far filed intensity properties of the light output by the illumination device 100 need to be further customized. For example, a light divergence modifier 150 having an output aperture narrower than an input aperture (as described below in connection with FIG. 3A, for instance) can be used to expand divergence of the modified angular range 155 relative to divergence of the guided angular range 135. The wider divergence of the modified light provided by the light divergence modifier 150 to the extractor surface can be exploited to increase the divergence of the light output by the optical extractor 140 into the ambient environment for lowered luminous intensity and perhaps more uniform spatial near field luminance. Oppositely, a light divergence modifier 150 having an output aperture wider than an input aperture can be used (as described below in connection with FIG. 3B, for instance.) The latter embodiment could thus provide a higher output luminous intensity in a given peak direction because of the narrower divergence of the modified angular range 155 relative to divergence of the guided angular range 135. As another example, a light divergence modifier 150 that is asymmetric relative to the y-z plane can be used to change the prevalent propagation direction of the modified angular range 155 relative the prevalent propagation direction of the guided angular range 135. Each of these variations is directed to the ability to manipulate the zonal luminous intensity profile and near field luminance properties of the exit surfaces of the extractor 140.

Figure 1B:
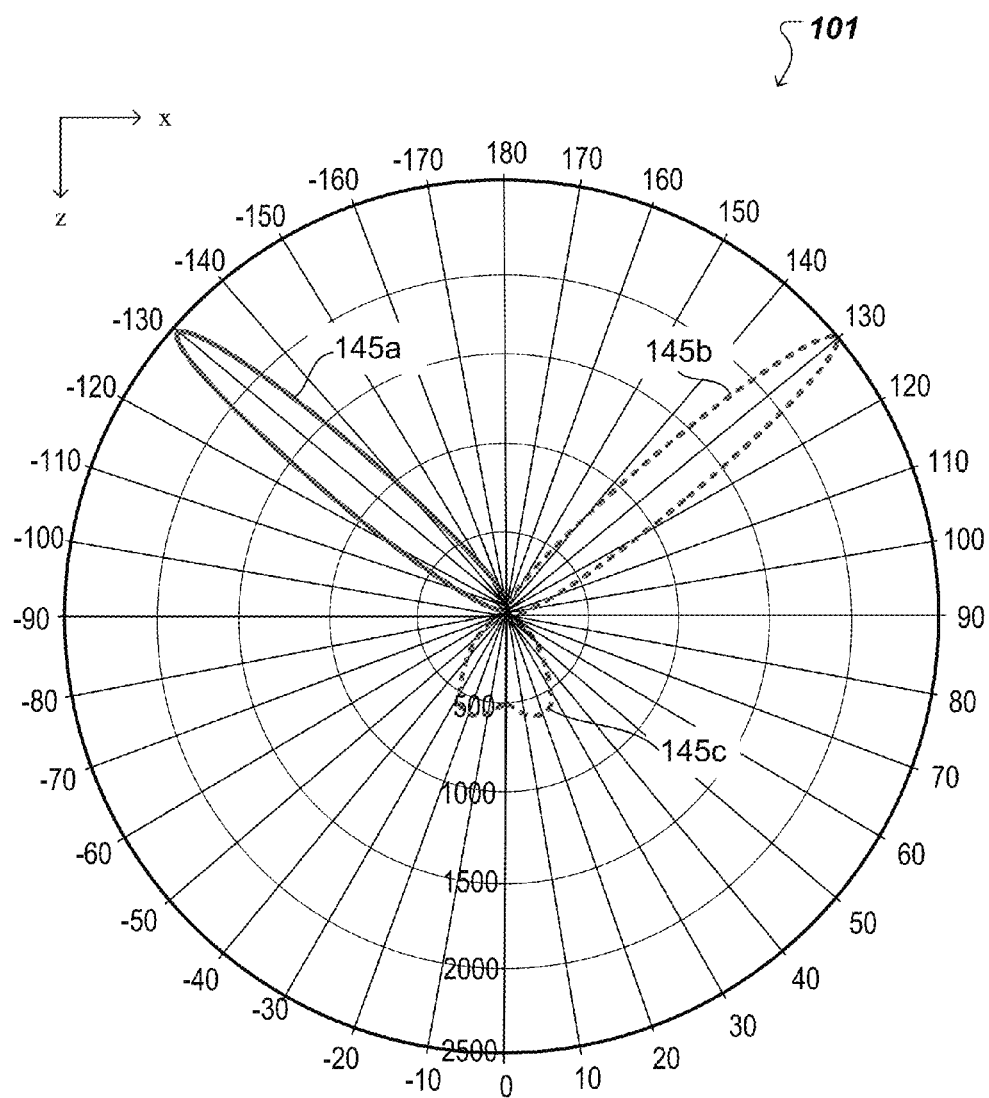
FIG. 1B is an example intensity profile of the luminaire module shown in FIG. 1A.

FIG. 1B shows an x-z cross-section of an example far-field light intensity profile 101 of the illumination device 100 that is elongated along the y-axis (perpendicular to the sectional plane of FIG. 1A). In some implementations, the far-field light intensity profile 101 includes a first output lobe 145a representing light output by the illumination device 100 in the first output angular range 145'. In this case, a propagation direction of the first output angular range 145' is along the about—130° bisector of the first output lobe 145a. In some implementations, in addition to the first output lobe 145a, the far-field light intensity profile 101 includes one or more of a second output lobe 145b representing light output by the illumination device 100 in the second output angular range 145" or a third output lobe 145c representing light output by the illumination device 100 in the third output angular range 145'". In this case, a propagation direction of the second output angular range 145" is along the about +130° bisector of the second output lobe 145b and a propagation direction of the third output angular range 145'" is along the about 0° bisector of the third output lobe 145c.

In this case, each of a divergence of the first output angular range 145' (represented by a width of the first output lobe 145a) and a divergence of the second output angular range 145" (represented by a width of the second output lobe 145b) is smaller than a divergence of the third output angular range 145'" (represented by a width of the third output lobe 145c). In general, composition and geometry of the couplers 120, the light guide 130, the light divergence modifier 150 and the extractor 140 of the illumination device 100 can affect the far-field light intensity profile 101, e.g., the propagation direction and divergence associated with the first output lobe 145a, and, optionally, of the second 145b and third 145c output lobes. As described in detail below, divergencies of the output angular ranges 145', 145" and 145'" (represented by respective widths of the first output lobe 145a, the second output lobe 145b and the third output lobe 145c) can specifically depend on a configuration of the light divergence modifier 150. Additionally, the configuration of the light divergence modifier 150 can also influence the prevalent propagation direction of at least the third output angular range 145'" (represented by an orientation of the third output lobe 145c).

Prior to describing details of various embodiments of the illumination device 100 that are configured with a combination of a light guide and a light divergence modifier, a light guide illumination device is described for which the light guide provides the guided light directly to the optical extractor, without the use of a light divergence modifier.

(ii) Light Guide Luminaire Module without a Light Divergence Modifier

Figure 2A:
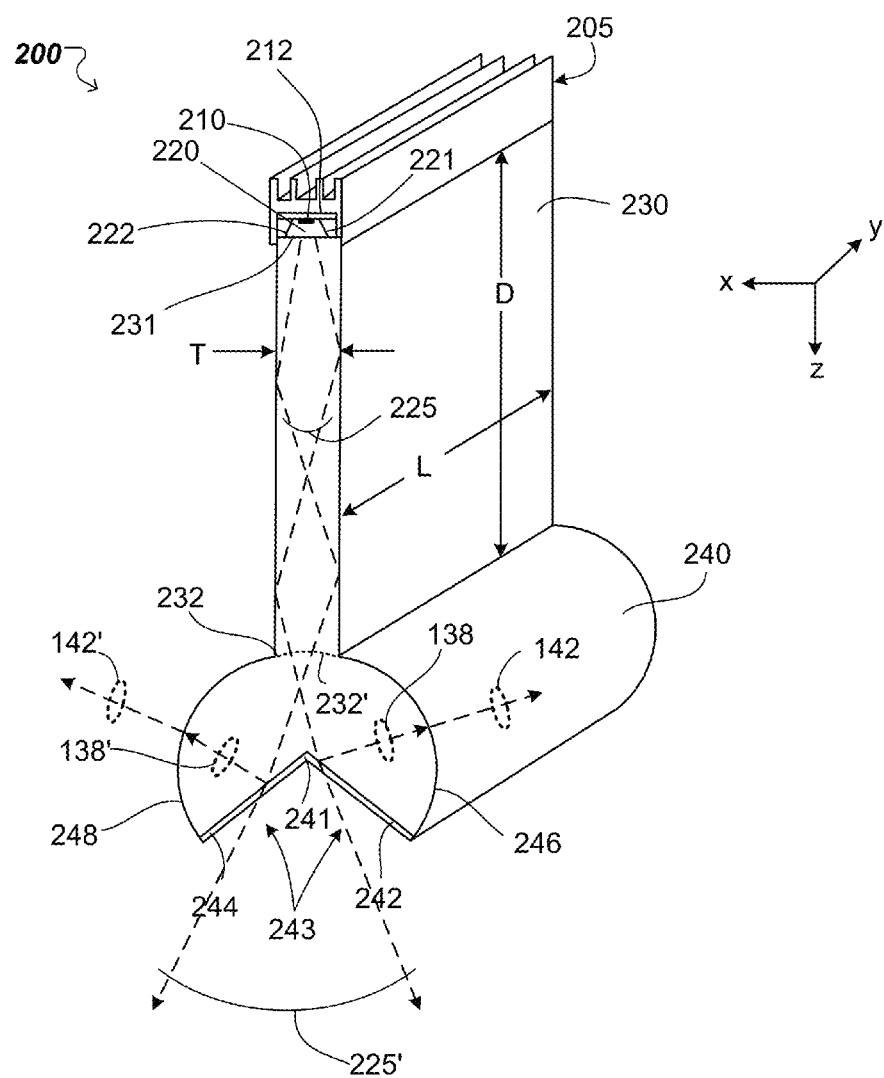

Referring to FIG. 2A, in which a Cartesian coordinate system is shown for reference, a luminaire module 200 includes a mount 212 having a plurality of LEEs 210 distributed along a first surface of the mount 212. The mount with the LEEs 210 is disposed at a first (e.g., upper) edge 231 of a light guide 230. Once again, the positive z-direction is referred to as the "forward" direction and the negative z-direction is the "backward" direction. Sections through the luminaire module 200 parallel to the x-z plane are referred to as the "cross-section" or "cross-sectional plane" of the luminaire module. Also, luminaire module 200 extends along the y-direction, so this direction is referred to as the "longitudinal" direction of the luminaire module. Implementations of luminaire modules can have a plane of symmetry parallel to the y-z plane, be curved or otherwise shaped. This is referred to as the "symmetry plane" of the luminaire module.

Multiple LEEs 210 are disposed on the first surface of the mount 212, although only one of the multiple LEEs 210 is shown in FIG. 2A. For example, the plurality of LEEs 210 can include multiple white LEDs. The LEEs 210 are optically coupled with one or more optical couplers 220 (only one of which is shown in FIG. 2A). An optical extractor 240 is disposed at second (e.g., lower) edge 232 of light guide 230.

Mount 212, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the mount 212 will generally depend, inter alia, on the length L, where more LEEs are used for longer luminaire modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 200 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. In some implementations, a heat-sink 205 can be attached to the mount 212 to extract heat emitted by the plurality of LEEs 210. The heat-sink 205 can be disposed on a surface of the mount 212 opposing the side of the mount 212 on which the LEEs 210 are disposed. The luminaire module 200 can include one or multiple types of LEEs, for example one or more subsets of LEEs in which each subset can have different color or color temperature.

Optical coupler 220 includes one or more solid pieces of transparent optical material (e.g., a glass material or a transparent plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 225) reflects off the planar surfaces of the light guide by TIR and spatially mixes within the light guide. The mixing can help achieve illuminance and/or color uniformity, along the y-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent optical material (e.g., a glass material or a transparent plastic, such as polycarbonate or acrylic) that can be the same as or different from the material forming light guide 230. In the example implementation shown in FIG. 2A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 225 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. As such, some light is transmitted in the forward direction (along the z-axis) through surfaces 242 and 244 of the optical extractor 240 in an output angular range 225'. In some cases, the light transmitted in the output angular range is refracted. In this way, the redirecting surface 243 acts as a beam splitter rather than a mirror, and transmits in the output angular range 225' a desired portion of incident light, while reflecting the remaining light in angular ranges 138 and 138'.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 200 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 200 corresponds to the emission spectrum of the LEEs 210. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between R/n and $R*(1+n^2)^{(-1/2)}$, where R is the radius of curvature of the light-exit surfaces (246 and 248 in FIG. 2A) of the extractor 240 and n is the index of refraction of the portion of the extractor that is opposite of the wavelength-conversion material as viewed from the reflective surfaces (242 and 244 in FIG. 2A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138 towards the output surface 246, the second portion of the redirecting surface 244 provides light having an angular distribution 138' towards the output surface 246. The light exits optical extractor through output surfaces 246 and 248. In general, the output surfaces 246 and 248 have optical power, to redirect the light exiting the optical extractor 240 in angular ranges 142 and 142', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the luminaire module 200 is attached to a ceiling of a room (e.g., the forward direction is towards the floor) such configurations can help avoid glare and an appearance of non-uniform illuminance.

In general, the light intensity distribution provided by luminaire module 200 reflects the symmetry of the luminaire module's structure about the y-z plane. For example, referring to FIG. 1B, light output in angular range 142' corresponds to the first output lobe 145a of the far-field light intensity distribution 101, light output in angular range 142 corresponds to the second output lobe 145b of the far-field light intensity distribution 101 and light output (leaked) in angular range 225' corresponds to the third output lobe 145c of the far-field light intensity distribution 101. In general, an intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the output first 145a and second 145b lobes in the far-field light intensity profile 101. Additionally, a ratio of an amount of light in the combination of first 145a and second 145b output lobes and light in the third output lobe 145c is controlled by reflectivity and transmissivity of the redirecting surfaces 242 and 244. For example, for a reflectivity of 90% and transmissivity of 10% of the redirecting surfaces 242, 244, 45% of light can be output in the output angular range 142' corresponding to the first output lobe 142a, 45% light can be output in the output angular range 142 corresponding to the second output lobe 142b, and 10% of light can be output in the output angular range 225' corresponding to the third output lobe 142c.

In some implementations, the orientation of the output lobes 145a, 145b can be adjusted based on the included angle of the v-shaped groove 241 formed by the portions of the redirecting surface 242 and 244. For example, a first included angle results in a far-field light intensity distribution 101 with output lobes 145a, 145b located at relatively smaller angles compared to output lobes 145a, 145b of the far-field light intensity distribution 101 that results for a second included angle larger than the first angle. In this manner, light can be extracted from the luminaire module 200 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145a, 145b. Depending of the divergence of the angular range 225 of the light that is received at the input end of the optical extractor 232', concave reflective surfaces 242, 244 can narrow the lobes 145a, 145b output by the optical extractor 240 (and illustrated in FIG. 1B), while convex reflective surfaces 242, 244 can widen the lobes 145a, 145b output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to output light into different output angular ranges 142, 142' from those shown in FIG. 2A. In some implementations, illumination devices can output light into lobes 145a, 145b that have a different divergence or propagation direction than those shown in FIG. 1B. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 1B. The "direction" refers to the direction at which a lobe is brightest. In FIG. 1B, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The luminaire modules can include other features useful for tailoring the intensity profile. For example, in some implementations, luminaire modules can include an optically diffuse material that can diffuse light in a controlled manner to aid homogenizing the luminaire module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on surface of the circular structure and has an angle of incidence less than the critical angle and will exit the circular structure without experiencing TIR. Light rays propagating within the spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n^2)^{(-1/2)}$, which is smaller than R/n, will be subject to small Fresnel reflection at the surface of radius R when exiting the circular structure. This condition may be referred to as Brewster geometry. Implementations may be configured accordingly.

Referring again to FIG. 2A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 242 and 244 exits through surfaces 246 and 248, respectively, without experiencing TIR.

Figure 2B:
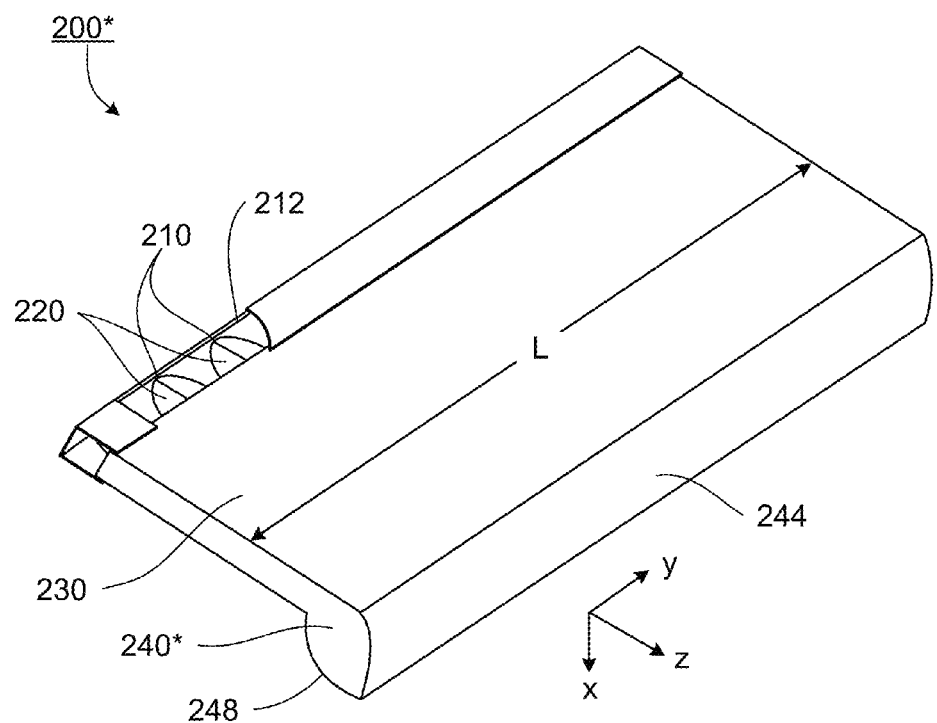

In the example implementations described above in connection with FIG. 2A, the luminaire module 200 is configured to output light into output angular ranges 142 and 142'. In other implementations, the light guide-based luminaire module 200 is modified to output light into a single output angular range 142'. FIG. 2B shows such light guide-based luminaire module 200* configured to output light on a single side of the light guide is referred to as a single-sided luminaire module. The single-sided luminaire module 200* is elongated along the y-axis like the luminaire module 200 shown in FIG. 2A. Also like the luminaire module 200, the single-sided luminaire module 200* includes a mount 212 and LEEs 210 disposed on a surface of the mount 212 along the y-axis to emit light in a first angular range. The single-sided luminaire module 200* further includes optical couplers 220 arranged and configured to redirect the light emitted by the LEEs 210 in the first angular range into a second angular range 225 that has a divergence smaller than the divergence of the first angular range at least in the x-z cross-section. Also, the single-sided luminaire module 200* includes a light guide 230 to guide the light redirected by the optical couplers 220 in the second angular range 225 from a first end 231 of the light guide to a second end 232 of the light guide. Additionally, the single-sided luminaire module 200* includes a single-sided extractor (denoted 240*) to receive the light guided by the light guide 230. The single-sided extractor 240* includes a redirecting surface 244 to redirect the light received from the light guide 230 into a third angular range 138', like described for luminaire module 200 with reference to FIG. 2A, and an output surface 248 to output the light redirected by the redirecting surface 244 in the third angular range 138' into a fourth angular range 142'.

A light intensity profile of the single-sided luminaire module 200* is represented in FIG. 1B as a single output lobe 145a. The single output lobe 145a corresponds to light output by the single-sided luminaire module 200* in the fourth angular range 142'.

FIG. 2C shows an embodiment 200' of the luminaire module 200 that also is elongated along an axis (e.g., y-axis) perpendicular to the forward direction (e.g., along the z-axis.) In this case, a length L of the light guide 230 along the elongated dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05D, 0.1D or 0.2D, for instance, light from multiple, point-like LEEs 210—distributed along the elongated dimension L—that is edge-coupled into the light guide 230 at the receiving end can efficiently mix and become uniform (quasi-continuous) along the y-axis by the time it propagates to the opposing end.

FIG. 2D shows a luminaire module 200'' that has (e.g., continuous or discrete) rotational symmetry about the forward direction (e.g., z-axis.) Here, a diameter T of the light guide 230 is a fraction of the distance D traveled by the guided light from the receiving end to the opposing end of the light guide 230. For example, the diameter of the light guide 230 can be T=0.05D, 0.1D or 0.2D, for instance.

Other open and closed shapes of the luminaire module 200 are possible. FIGS. 2E and 2F show a perspective view and a bottom view, respectively, of a luminaire module 200''' for which the light guide 230 has two opposing side surfaces 232a, 232b that form a closed cylinder shell of thickness T. In the example illustrated in FIGS. 2E and 2F, the x-y cross-section of the cylinder shell formed by the opposing side surfaces 232a, 232b is oval. In other cases, the x-y cross-section of the cylinder shell can be circular or can have other shapes. Some implementations of the example luminaire module 200''' may include a specular reflective coating on the side surface 232a of the light guide 230. For T=0.05D, 0.1D or 0.2D, for instance, light from multiple, point-like LEEs 210—distributed along an elliptical path of length L—that is edge-coupled into the light guide 230 at the receiving end can efficiently mix and become uniform (quasi-continuous) along such an elliptical path by the time it propagates to the opposing end.

Light guided luminaire modules like the ones described in this section—for which the light guide provides guided light directly to an optical extractor without the use of a light divergence modifier—can be used to obtain luminaire modules that include a combination of a light guide and a light divergence modifier, as described in the following sections.

(iii) Light Guide Illumination Devices with Different Light Divergence Modifiers FIGS. 3A-3G show aspects of an illumination device 300-$j$ that includes a combination of a light guide 330 and a light divergence modifier 350-$j$, where j is in {a, b, c, d, e, f, g}. In these examples, the illumination device 300-$j$ also includes LEEs 310, one or more corresponding optical couplers 320 and an optical extractor 340. In some implementations, the illumination device 300-$j$ has an elongated configuration, e.g., as shown in FIG. 2C, with a longitudinal dimension L along the y-axis (perpendicular to the page in FIG. 3A.) In this case, L can be 1', 2' or 4', for instance. In other implementations, the illumination device 300-$j$ can have another elongated configuration, as illustrated in FIGS. 2E-2F. In some other implementations, the illumination device 300-$j$ can have a non-elongated configuration, e.g., with rotational symmetry around the z-axis, as illustrated in FIG. 2D.

The LEEs 310 are disposed on a substrate 312 and have a structure similar to a structure of the LEEs 110 of the illumination device 100 described above in connection with FIG. 1A or a structure of the LEEs 210 of the luminaire modules 200, 200*, 200', 200'', 200''' described above in connection with FIGS. 2A-2E.

Further, the optical couplers 320 have a structure similar to a structure of the optical couplers 120 of the illumination device 100 described above in connection with FIG. 1A or a structure of the optical couplers 220 of the luminaire modules 200, 200*, 200', 200'', 200''' described above in connection with FIGS. 2A-2E. Furthermore, the light guide 330 has a structure similar to a structure of the light guide 130 of the illumination device 100 described above in connection with FIG. 1A or a structure of the light guide 230 of the luminaire modules 200, 200*, 200', 200'', 200''' described above in connection with FIGS. 2A-2E. Here, the light guide 330 has a length D along the z-axis, e.g., D=10, 20, 50 cm, from a receiving end to an opposing end, and a thickness T along the x-axis that can be much smaller than the length D, e.g., T≈5% D, 10% D or 20% D. The optical couplers 320 are optically coupled to the input end of the light guide 330. In some implementations, the optical couplers 320 are bonded to the input end of the light guide 330. In other implementations, the optical couplers 320 and the light guide 330 are integrally formed.

The light divergence modifier 350-$j$, for j in {a, b, c, d, e, f}, has an input aperture and an output aperture separated by a distance $\Delta$, which represents a length of the light divergence modifier 350-$j$. Here, the length $\Delta$ of the light divergence modifier 350-$j$ is between 0.05D≤$\Delta$≤0.5D, e.g., 0.1D, 0.2D, 0.3D, or 0.4D. The input aperture of the light divergence modifier 350-$j$ is optically coupled to the output end of the light guide 330. In some implementations, the input aperture of the light divergence modifier 350-$j$ is bonded to the output end of the light guide 330. In other implementations, the light guide 330 and the light divergence modifier 350-$j$ are integrally formed. The output aperture of the light divergence modifier 350-$j$ is optically coupled to the optical extractor 340. In some implementations, the output aperture of the light divergence modifier 350-j is bonded to the optical extractor 340. In other implementations, the light divergence modifier 350-j and the optical extractor 340 are integrally formed. Alternatively, the light divergence modifier 350-g of an illumination device 300-g is an interface between the light guide 330 and the optical extractor 340 configured as a two dimensional (2D) grating. In this case, the length Δ of the light divergence modifier 150 collapses to zero, Δ→0, and the input aperture of the light divergence modifier 350-g represents a side of the interface adjacent to the light guide 330, and the output aperture of the light divergence modifier 350-g represents a side of the interface adjacent to the optical extractor 340.

Moreover, the optical extractor 340 has a structure similar to a structure of the optical extractor 130 of the illumination device 100 described above in connection 1A or a structure of the optical extractor 240/240* of the luminaire modules 200, 200*, 200', 200", 200''' described above in connection with FIGS. 2A-2E.

During operation, the LEEs 310 emit light within a first angular range 115 relative to the z-axis. The one or more couplers 320 are configured to receive the light from the LEEs 310 within the first angular range 115 and provide light within a second angular range 125 to the light guide 330. Here, the divergence of the second angular range 125 is smaller than the divergence of the first angular range 115, such that the combination (i) of the second angular range 125 and (ii) a numerical aperture of the light guide 330 is chosen to allow for the light received from the one or more couplers 320 at the receiving end of the light guide 330 to propagate to the opposing end of the light guide 330, for example, via TIR.

In this manner, the light received by the light guide 330 at the receiving end from the one or more couplers 320 in the second angular range 125 is guided forward (along the z-axis) by the light guide 330 from its receiving end to its opposing end. At the opposing end, the guided light has a third angular range 135. In some implementations, the third angular range 135 is substantially the same as the second angular range 125. Guided light provided by the light guide 330 at the opposing end in an angular range 135 is received at the input aperture of the light divergence modifier 350-j. The guided light received at the input aperture is modified by the light divergence modifier 350-j such that modified light provided at the output aperture of the light divergence modifier 350-j has a modified angular range 155 different from the guided angular range 135. The modified light provided by the light divergence modifier 350-j at the output aperture in an angular range 155 is received by the optical extractor 340. The modified light received by the optical extractor 340 is output by the optical extractor 340 in first and second backward output angular ranges 145' and 145", and optionally in third forward output angular range 145'''. In this example, a direction of propagation of the output light in the first backward output angular range 145' has a component in the backward direction (antiparallel with the z-axis) and another component to the right of the light guide 330 (parallel with the x-axis). Further, a direction of propagation of the output light in the second backward output angular range 145" has a component in the backward direction (antiparallel with the z-axis) and another component to the left of the light guide 130 (antiparallel with the x-axis). Optionally, a direction of propagation of the output light in the third forward output angular range 145''' is along the forward direction (parallel with the z-axis).

Various embodiments of the light divergence modifier 350-j, where j is in {a, b, c, d, e, f, g}, are described below.

Example 1

Tapered Light Divergence Modifier

Figure 3A:
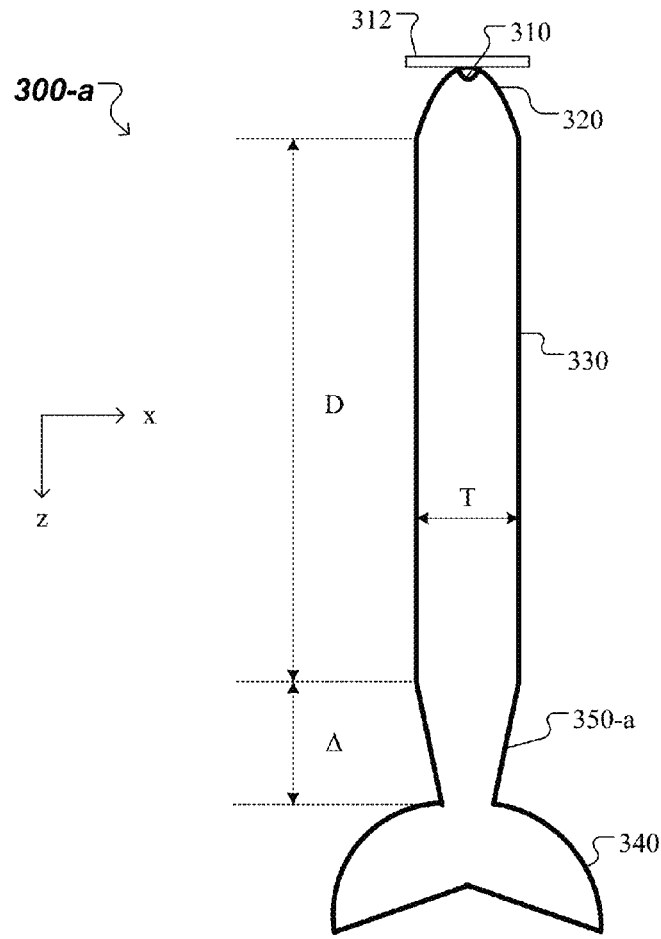
FIGS. 3A-3G show examples of luminaire modules that include different combinations of a light guide with different light divergence modifiers.

FIG. 3A shows an illumination device 300-a that includes a combination of the light guide 330 and a tapered light divergence modifier 350-a. The tapered light divergence modifier 350-a has an input aperture and an output aperture, such the input aperture is wider than the output aperture. Further, the input and output apertures are separated by a distance Δ, which represents a length of the tapered light divergence modifier 350-a. Here, the length Δ of the tapered light divergence modifier 350-a is between $0.05D \leq \Delta \leq 0.5D$, e.g., 0.1D, 0.2D, 0.3D, or 0.4D, where D is the distance between the input end and the output end of the light guide 330. The input aperture of the tapered light divergence modifier 350-a is optically coupled to the output end of the light guide 330. In some implementations, the input aperture of the tapered light divergence modifier 350-a is bonded to the output end of the light guide 330. In other implementations, the light guide 330 and the tapered light divergence modifier 350-a are integrally formed. The output aperture of the tapered light divergence modifier 350-a is optically coupled to the optical extractor 340. In some implementations, the output aperture of the tapered light divergence modifier 350-a is bonded to the optical extractor 340. In other implementations, the tapered light divergence modifier 350-a and the optical extractor 340 are integrally formed.

Further, the tapered light divergence modifier 350-a can be made from a material having the same refractive index $n_{350a}$ as a refractive index $n_{330}$ of a material from which the light guide 330 is made, $n_{350a} \approx n_{330}$, and/or as a refractive index $n_{340}$ of a material from which the optical extractor 340 is made, $n_{350a} \approx n_{340}$. In some such cases, $n_{330} \approx n_{340}$. Alternatively, the tapered light divergence modifier 350-a can be made from a material having a different refractive index $n_{350a}$ relative to a refractive index $n_{330}$ of a material from which the light guide 330 is made, $n_{350a} \neq n_{330}$, and/or relative to a refractive index $n_{340}$ of a material from which the optical extractor 340 is made, $n_{350a} \neq n_{340}$. When the light guide 330, the tapered light divergence modifier 350-a, and/or the optical extractor 340 are made from solid materials, their respective refractive indices $n_{330}$, $n_{350a}$ and/or $n_{340}$ are larger than 1. When the light guide 330, the tapered light divergence modifier 350-a, and/or the optical extractor 340 are hollow, their respective refractive indices $n_{330}$, $n_{350a}$ and/or $n_{340}$ are equal to 1.

As the input aperture of the tapered light divergence modifier 350-a is larger than its output aperture, divergence of the modified angular range 155 of the modified light provided by the tapered light divergence modifier 350-a at the output interface is larger than divergence of the guided angular range 135 of the guided light received by the tapered light divergence modifier 350-a at the input aperture. A set of parameters determines a ratio of the divergence of the modified angular range 155 of the modified light provided by the tapered light divergence modifier 350-a at the output interface to the divergence of the guided angular range 135 of the guided light received by the tapered light divergence modifier 350-a at the input aperture. This set of parameters includes (i) a ratio of a cross-section $S_{in}$ (e.g., in the x-y plane) of the input aperture to a cross-section $S_{out}$ (e.g., in the x-y plane) of the output aperture; (ii) the length Δ of the tapered light divergence modifier 350-a; (iii) a relative refractive index $n_{330}/$ $n_{350}$ of a material from which the light guide 330 is made and a material from which the tapered light divergence modifier 350-a is made; and (iv) a relative refractive index $n_{350a}/n_{340}$ of a material from which the tapered light divergence modifier 350-a is made and a material from which the optical extractor 340 is made.

When the illumination device 300-a is elongated along the y-axis (perpendicular to the page), the tapered light divergence modifier 350-a includes a pair of opposing side surfaces (e.g., orthogonal to the x-z plane) extending along the length Δ of the tapered light divergence modifier 350-a (along the z-axis) between the input aperture and the output aperture. For example, the light received at the input aperture propagates to the output aperture by specularly reflecting between the pair of opposing side surfaces. As another example, when the tapered light divergence modifier 350-a is made from a solid material, the light received at the input aperture propagates to the output aperture via TIR reflections between the pair of opposing side surfaces. In the latter example, the parameters (i), (ii), (iii) and (iv) are selected such that the light propagating through the tapered light divergence modifier 350-a is incident on each of the pair of opposing side surfaces at angles larger than a critical angle, over the entire length Δ of the tapered light divergence modifier 350-a.

Moreover, in some cases, at least one of the opposing side surfaces is planar. In some cases, both of the opposing side surfaces are planar. Here, the tapered light divergence modifier 350-a can be shaped as a truncated prism with rectangular bases (where the bases are parallel to the x-y plane, for instance.) When the illumination device 300-a has rotational symmetry around the z-axis, the tapered light divergence modifier 350-a can be shaped as a truncated prism with rotationally symmetric bases (where the bases are parallel to the x-y plane, for instance.) Examples of rotationally symmetric bases are circles, equilateral triangles, squares, hexagons, octagons, etc.

Example 2

Flared Light Divergence Modifier

Figure 3B:
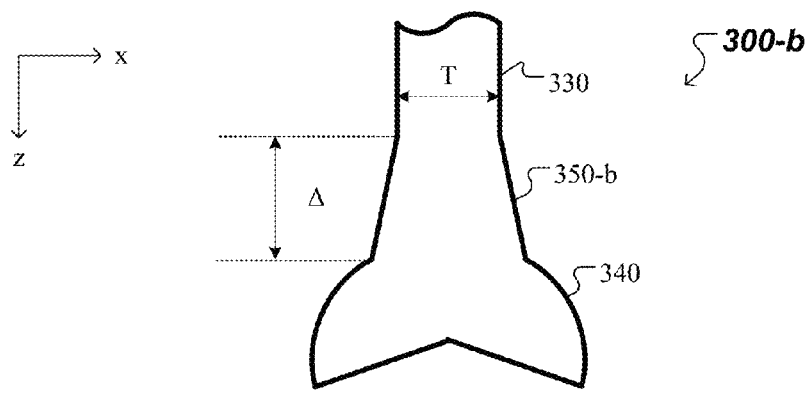

FIG. 3B shows a portion of an illumination device 300-b that includes a combination of the light guide 330 and a flared light divergence modifier 350-b. The flared light divergence modifier 350-b has an input aperture and an output aperture, such the input aperture is narrower than the output aperture. Further, the input and output apertures are separated by a distance Δ, which represents a length of the flared light divergence modifier 350-b. Here, the length Δ of the flared light divergence modifier 350-b is between 0.05D≤Δ≤0.5D, e.g., 0.1D, 0.2D, 0.3D, or 0.4D, where D is the distance between the input end and the output end of the light guide 330. The input aperture of the flared light divergence modifier 350-b is optically coupled to the output end of the light guide 330. In some implementations, the input aperture of the flared light divergence modifier 350-b is bonded to the output end of the light guide 330. In other implementations, the light guide 330 and the flared light divergence modifier 350-b are integrally formed. The output aperture of the flared light divergence modifier 350-b is optically coupled to the optical extractor 340. In some implementations, the output aperture of the flared light divergence modifier 350-b is bonded to the optical extractor 340. In other implementations, the flared light divergence modifier 350-b and the optical extractor 340 are integrally formed.

Further, the flared light divergence modifier 350-b can be made from a material having the same refractive index $n_{350b}$ as a refractive index $n_{330}$ of a material from which the light guide 330 is made, $n_{350b} \approx n_{330}$, and/or as a refractive index $n_{340}$ of a material from which the optical extractor 340 is made, $n_{350b} \approx n_{340}$. In some such cases, $n_{330} \approx n_{340}$. Alternatively, the flared light divergence modifier 350-b can be made from a material having a different refractive index $n_{350b}$ relative to a refractive index $n_{330}$ of a material from which the light guide 330 is made, $n_{350b} \neq n_{330}$, and/or relative to a refractive index $n_{340}$ of a material from which the optical extractor 340 is made, $n_{350b} \neq n_{340}$. When the light guide 330, the flared light divergence modifier 350-b, and/or the optical extractor 340 are made from a solid material, their respective refractive indices $n_{330}$, $n_{350b}$ and/or $n_{340}$ are larger than 1. When the light guide 330, the flared light divergence modifier 350-b, and/or the optical extractor 340 are hollow, their respective refractive indices $n_{330}$, $n_{350b}$ and/or $n_{340}$ are equal to 1.

As the input aperture of the flared light divergence modifier 350-b is larger than its output aperture, divergence of the modified angular range 155 of the modified light provided by the flared light divergence modifier 350-b at the output interface is smaller than divergence of the guided angular range 135 of the guided light received by the flared light divergence modifier 350-b at the input aperture. A set of parameters determines a ratio of the divergence of the modified angular range 155 of the modified light provided by the flared light divergence modifier 350-b at the output interface to the divergence of the guided angular range 135 of the guided light received by the flared light divergence modifier 350-b at the input aperture. This set of parameters includes (i) a ratio of a cross-section $S_{in}$ (e.g., in the x-y plane) of the input aperture to a cross-section $S_{out}$ (e.g., in the x-y plane) of the output aperture; (ii) the length Δ of the flared light divergence modifier 350-b; (iii) a relative refractive index $n_{330}/n_{350b}$ of a material from which the light guide 330 is made and a material from which the flared light divergence modifier 350-b is made; and (iv) a relative refractive index $n_{350b}/n_{340}$ of a material from which the flared light divergence modifier 350-b is made and a material from which the optical extractor 340 is made.

When the illumination device 300-b is elongated along the y-axis (perpendicular to the page), the flared light divergence modifier 350-b includes a pair of opposing side surfaces (e.g., orthogonal to the x-z plane) extending along the length Δ of the flared light divergence modifier 350-b (along the z-axis) between the input aperture and the output aperture. For example, the light received at the input aperture propagates to the output aperture by specularly reflecting between the pair of opposing side surfaces. As another example, when the flared light divergence modifier 350-b is made from a solid material, the light received at the input aperture propagates to the output aperture via TIR reflections between the pair of opposing side surfaces.

Moreover, in some cases, at least one of the opposing side surfaces is planar. In some cases, both of the opposing side surfaces are planar. Here, the flared light divergence modifier 350-b can be shaped as a truncated prism with rectangular bases (where the bases are parallel to the x-y plane, for instance.) When the illumination device 300-b has rotational symmetry around the z-axis, the flared light divergence modifier 350-b can be shaped as a truncated prism with rotationally symmetric bases (where the bases are parallel to the x-y plane, for instance.) Examples of rotationally symmetric bases are circles, equilateral triangles, squares, hexagons, octagons, etc.

Example 3

Lensed Light Divergence Modifier

Figure 3C:
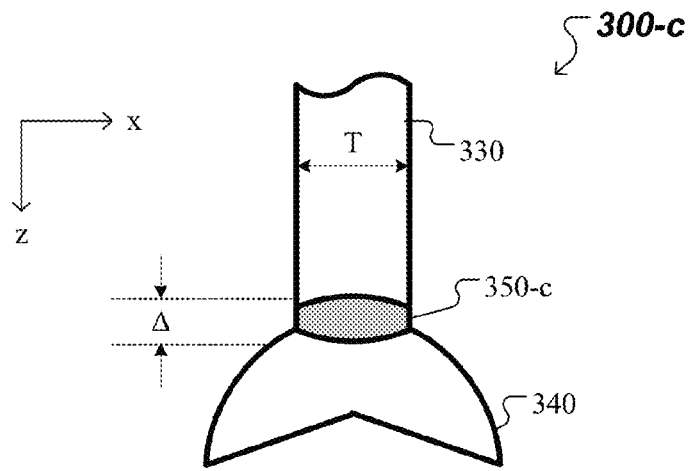
Figure 3D:
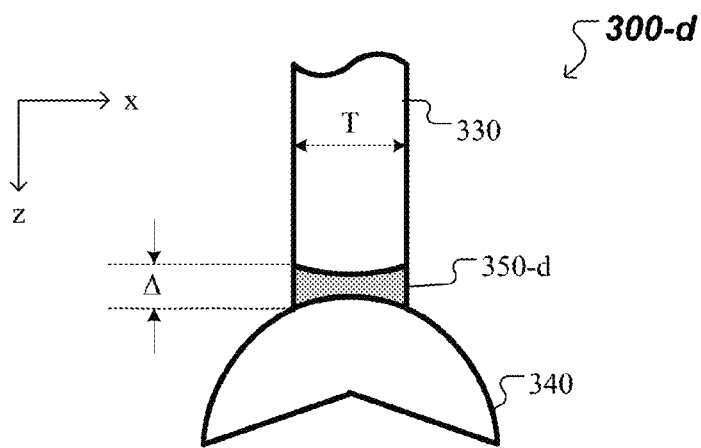
Figure 3E:
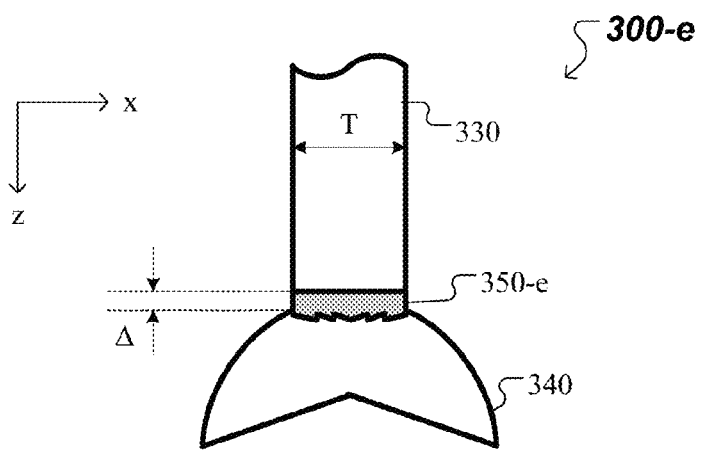

FIGS. 3C, 3D and 3E show respective portions of illumination devices 300-j that includes a combination of the light guide 330 and a lensed light divergence modifier 350-j, where j is in {c, d, e}. The lensed light divergence modifier 350-j is a lens (or a lens assembly including 2, 3 or more optically coupled lenses) that has an input face and an output face separated by a distance Δ, which represents a thickness of the lensed light divergence modifier 350-j. Here, the length Δ of the lensed light divergence modifier 350-j is between 0.02D≤Δ≤0.1D, e.g., 0.04D, 0.06D or 0.08D where D is the distance between the input end and the output end of the light guide 330. Moreover, the input face of the lensed light divergence modifier 350-j is bonded to the output end of the light guide 330, and the output face of the lensed light divergence modifier 350-j is bonded to the optical extractor 340. Here, the lensed light divergence modifier 350-j is made from a material having a refractive index $n_{350j}$ that is different relative to a refractive index $n_{330}$ of a material from which the light guide 330 is made, $n_{350j} \neq n_{330}$, and/or relative to a refractive index $n_{340}$ of a material from which the optical extractor 340 is made, $n_{350j} \neq n_{340}$, where j is in {c, d, e}.

A set of parameters determines a ratio of the divergence of the modified angular range 155 of the modified light provided by the lensed light divergence modifier 350-j through the output face to the divergence of the guided angular range 135 of the guided light received by the lensed light divergence modifier 350-j through the input face. This set of parameters includes (i) an effective focal length, fj, where j is in {c, d, e}, of the lens (or the lens assembly) that forms the lensed light divergence modifier 350-j; (ii) the thickness Δ of the lens (or the lens assembly) that forms the lensed light divergence modifier 350-j; (iii) a relative refractive index $n_{330}/n_{350j}$ of a material from which the light guide 330 is made and a material from which the lensed light divergence modifier 350-j is made; and (iv) a relative refractive index $n_{350j}/n_{340}$ of a material from which the lensed light divergence modifier 350-j is made and a material from which the optical extractor 340 is made.

In the example illustrated in FIG. 3C, the lensed light divergence modifier 350-c of the illumination device 300-c includes a convergent lens with a positive focal length $f_c$. As such, divergence of the modified angular range 155 of the modified light provided by the lensed light divergence modifier 350-c through the output face is smaller than divergence of the guided angular range 135 of the guided light received by the lensed light divergence modifier 350-c through the input face. When the relative refractive indices $n_{350c}/n_{330}$ and $n_{350c}/n_{340}$ are larger than 1, in some implementations, the input face of the convergent lens is convex and the output face of the convergent lens is flat or concave relative to the propagation direction of light through the lensed light divergence modifier 350-c (e.g., along the z-axis.) In some implementations, the input face of the convergent lens is convex or flat and the output face of the convergent lens is concave relative to the propagation direction of light through the lensed light divergence modifier 350-c (e.g., along the z-axis.) However, when the relative refractive indices $n_{350c}/n_{330}$ and $n_{350c}/n_{340}$ are less than 1, in some implementations, the input face of the convergent lens is concave and the output face of the convergent lens is flat or convex relative to the propagation direction of light through the lensed light divergence modifier 350-c (e.g., along the z-axis.) In some implementations, the input face of the convergent lens is concave or flat and the output face of the convergent lens is convex relative to the propagation direction of light through the lensed light divergence modifier 350-c (e.g., along the z-axis.)

In the example illustrated in FIG. 3D, the lensed light divergence modifier 350-d of the illumination device 300-d includes a divergent lens with a negative focal length fd. As such, divergence of the modified angular range 155 of the modified light provided by the lensed light divergence modifier 350-d through the output face is larger than divergence of the guided angular range 135 of the guided light received by the lensed light divergence modifier 350-d through the input face. When the relative refractive indices $n_{350d}/n_{330}$ and $n_{350d}/n_{340}$ are larger than 1, in some implementations, the input face of the divergent lens is concave and the output face of the divergent lens is flat or convex relative to the propagation direction of light through the lensed light divergence modifier 350-d (e.g., along the z-axis.) In some implementations, the input face of the divergent lens is concave or flat and the output face of the divergent lens is concave relative to the propagation direction of light through the lensed light divergence modifier 350-d (e.g., along the z-axis.) However, when the relative refractive indices $n_{340d}/n_{330}$ and $n_{350d}/n_{340}$ are less than 1, in some implementations, the input face of the divergent lens is convex and the output face of the divergent lens is flat or concave relative to the propagation direction of light through the lensed light divergence modifier 350-d (e.g., along the z-axis.) In some implementations, the input face of the divergent lens is convex or flat and the output face of the divergent lens is concave relative to the propagation direction of light through the lensed light divergence modifier 350-d (e.g., along the z-axis.)

In the example illustrated in FIG. 3E, the lensed light divergence modifier 350-e of the illumination device 300-e includes a Fresnel lens with a desired positive or negative focal length $f_e$. At least one of the input or output faces of the Fresnel lens is faceted. In this manner, the thickness of the lensed light divergence modifier 350-e can be smaller than the thickness of the convergent lens of the lensed light divergence modifier 350-c or the divergent lens of the lensed light divergence modifier 350-d. In order for divergence of the modified angular range 155 of the modified light provided by the lensed light divergence modifier 350-e through the output face to be smaller than divergence of the guided angular range 135 of the guided light received by the lensed light divergence modifier 350-e through the input face, shapes and arrangement of the facets of the input and output faces of the lensed light divergence modifier 350-e and relative refractive indices $n_{350e}/n_{330}$ and $n_{350e}/n_{340}$ are selected to cause a positive effective focal length of the Fresnel lens. Alternatively, for divergence of the modified angular range 155 of the modified light provided by the lensed light divergence modifier 350-e through the output face to be larger than divergence of the guided angular range 135 of the guided light received by the lensed light divergence modifier 350-e through the input face, shapes and arrangement of the facets of the input and output faces of the lensed light divergence modifier 350-e and relative refractive indices $n_{350e}/n_{330}$ and $n_{350e}/n_{340}$ are selected to cause a negative effective focal length of the Fresnel lens.

Example 4

Diffractive Light Divergence Modifier

Figure 3F:
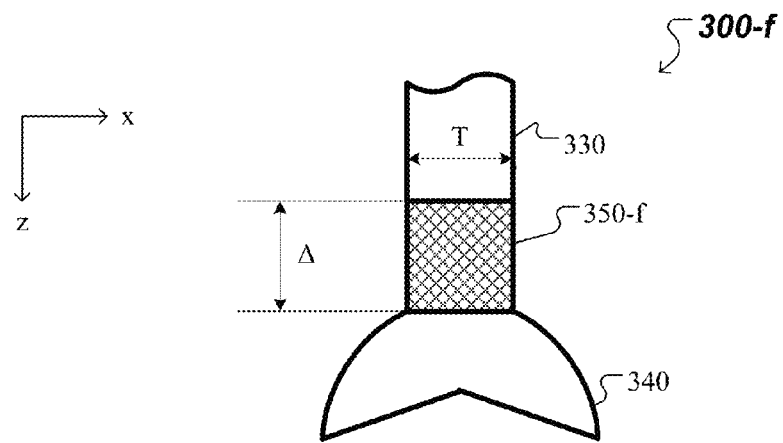
Figure 3G:
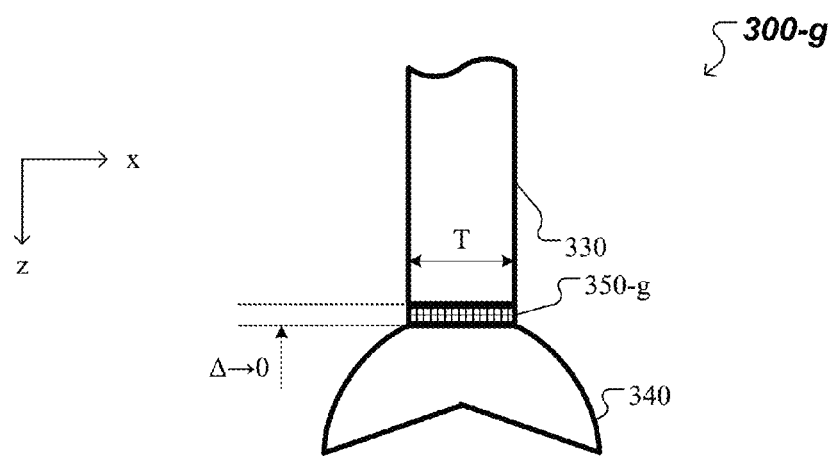

FIGS. 3F and 3G show respective portions of illumination devices 300-j that includes a combination of the light guide 330 and a diffractive light divergence modifier 350-j, where j is in {f, g}.

In the example illustrated in FIG. 3F, the diffractive light divergence modifier 350-*f* is a 3D grating that has an input face and an output face separated by a distance Δ, which represents a thickness of the diffractive light divergence modifier 350-*f*. Here, the thickness Δ of the diffractive light divergence modifier 350-*j* is between 0.02D≤Δ≤0.1D, e.g., 0.04D, 0.06D or 0.08D, where D is the distance between the input end and the output end of the light guide 330. This example of diffractive light divergence modifier is referred to as a 3D diffractive light divergence modifier 350-*f*. In some implementations, the input face of the 3D diffractive light divergence modifier 350-*f* is bonded to the output end of the light guide 330, and the output face of the 3D diffractive light divergence modifier 350-*f* is bonded to the optical extractor 340. In some implementations, the 3D diffractive light divergence modifier 350-*f* is integrally formed with the light guide 330, the optical extractor 340, or both.

The 3D grating (also referred to as a volume grating) includes portions of a volume of the 3D diffractive light divergence modifier 350-*f* with a refractive index different from a refractive index of a material from which the bulk of the 3D diffractive light divergence modifier 350-*f* is formed, such that these portions are arranged in a 3D pattern. For example, the 3D pattern can be a 3D lattice. As another example, the 3D pattern can be ordered in at least one direction, and disordered (e.g., randomly or pseudo-randomly) in the remaining direction(s). In some cases, the foregoing portions of the 3D diffractive light divergence modifier 350-*f* that form the 3D pattern can be voids in the bulk of the diffractive light divergence modifier 350-*f*. In other cases, the foregoing portions of the 3D diffractive light divergence modifier 350-*f* that form the 3D pattern can be inserts (metal flakes, dielectric spheres, etc.) in the bulk of the 3D diffractive light divergence modifier 350-*f*, such that a refractive index of the inserts is different from the refractive index of the bulk material.

In some implementations, such a 3D grating can be a photonic crystal. In other implementations, the 3D grating can be a volumetric hologram. The 3D patterns of the foregoing 3D gratings can be generated using micromachining, laser writing/printing, ion-implantation, etc.

Moreover, the 3D grating can be configured such that the divergence of the modified angular range 155 of the modified light provided by the 3D diffractive light divergence modifier 350-*f* through the output face and the divergence of the guided angular range 135 of the guided light received by the 3D diffractive light divergence modifier 350-*f* through the input face obey a target ratio. In some cases, the target ratio is larger than 1, such that the modified light provided by the 3D diffractive light divergence modifier 350-*f* spreads relative to the guided light provided by the light guide 330. In other cases, the target ratio is smaller than 1, such that the modified light provided by the 3D diffractive light divergence modifier 350-*f* focuses relative to the guided light provided by the light guide 330.

When the illumination device 300-*f* is elongated along the y-axis (perpendicular to the page), the 3D diffractive light divergence modifier 350-*f* includes a pair of opposing side surfaces (e.g., orthogonal to the x-z plane) extending along the thickness Δ of the 3D diffractive light divergence modifier 350-*f* (along the z-axis) between the input face and the output face. The light received at the input face propagates to the output face by diffracting off the 3D pattern of the 3D grating included in the 3D diffractive light divergence modifier 350-*f*. Here, the 3D diffractive light divergence modifier 350-*f* can be shaped as a prism with rectangular bases (where the bases are parallel to the x-y plane, for instance.) When the illumination device 300-*f* has rotational symmetry around the z-axis, the 3D diffractive light divergence modifier 350-*f* can be shaped as a prism with rotationally symmetric bases (where the bases are parallel to the x-y plane, for instance.) Examples of rotationally symmetric bases are circles, equilateral triangles, squares, hexagons, octagons, etc.

In the example illustrated in FIG. 3G, the diffractive light divergence modifier 350-*g* is an optical interface between the output end of the light guide 330 and the optical extractor 340. Here, the optical interface is configured as a 2D grating that has an input side and an output side. The input side is adjacent to the output end of the light guide 330 and the output side is adjacent to the optical extractor 340. This example of diffractive light divergence modifier is referred to as a 2D diffractive light divergence modifier 350-*g*.

The 2D grating (also referred to as a surface grating) includes portions of the optical interface between the light guide 330 and the optical extractor 340 with a refractive index different from a refractive index $n_{330}$ of a material from which the light guide 330 is formed and/or a refractive index $n_{340}$ of a material from which the optical extractor 340 is formed, such that these portions are arranged in a 2D pattern. For example, the 2D pattern can be a 2D lattice. As another example, the 2D pattern can be ordered only in one direction, and disordered (e.g., randomly or pseudo-randomly) in a remaining, orthogonal direction. In some cases, the foregoing portions of the 2D diffractive light divergence modifier 350-*g* that form the 2D pattern can be voids located at the interface between the light guide 330 and the optical extractor 340. In other cases, the foregoing portions of the 2D diffractive light divergence modifier 350-*g* that form the 2D pattern can be inserts (metal flakes, dielectric spheres, etc.) located at the interface between the light guide 330 and the optical extractor 340, such that a refractive index of the inserts is different from the refractive index $n_{330}$ of the material from which the light guide 330 is formed and/or the refractive index $n_{340}$ of the material from which the optical extractor 340 is formed. In some other cases, the foregoing portions of the 2D diffractive light divergence modifier 350-*g* that form the 2D pattern can be grooves, indentations or bumps formed at the interface between the light guide 330 and the optical extractor 340. In yet some other cases, the 2D pattern can be a surface hologram formed at the interface between the light guide 330 and the optical extractor 340.

In either of the foregoing cases, a thickness Δ of the 2D diffractive light divergence modifier 350-*f* is very thin in comparison to the distance D between the input end and the output end of the light guide 330, Δ<<D or Δ→0. For instance the out-of-plane thickness Δ of the 2D grating can be of order 0.01 mm, of order 0.1 mm or of order 1 mm.

Moreover, the 2D grating can be configured such that the divergence of the modified angular range 155 of the modified light provided by the 2D diffractive light divergence modifier 350-*g* through the output side and the divergence of the guided angular range 135 of the guided light received by the 2D diffractive light divergence modifier 350-*g* through the input face obey a target ratio. In some cases, the target ratio is larger than 1, such that the modified light provided by the 2D diffractive light divergence modifier 350-*g* spreads relative to the guided light provided by the light guide 330. In other cases, the target ratio is smaller than 1, such that the modified light provided by the 2D diffractive light divergence modifier 350-*g* focuses relative to the guided light provided by the light guide 330.

When the illumination device 300-*g* is elongated along the y-axis (perpendicular to the page), the 2D diffractive light divergence modifier 350-*g* can be shaped as a rectangular band (where input and output sides of the band are parallel to the x-y plane, for instance.) When the illumination device 300-g has rotational symmetry around the z-axis, the 2D diffractive light divergence modifier 350-d can be shaped as a patch with rotationally symmetric input and output sides (that are parallel to the x-y plane, for instance.) Examples of rotationally symmetric bases are circles, equilateral triangles, squares, hexagons, octagons, etc.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination device comprising:
a plurality of light-emitting elements (LEEs), wherein the LEEs are LEDs that emit white light;
a light guide having a pair of opposing surfaces extending in a forward direction from a first end of the light guide to a second end of the light guide, the light guide being positioned to receive at the first end light emitted by the LEEs and configured to guide the light to the second end, wherein divergence of the light received at the first end and divergence of the guided light that reaches the second end are substantially the same;
a light divergence modifier tapered such that an input aperture of the light divergence modifier is larger than an output aperture of the light divergence modifier, the input aperture of the light divergence modifier being optically coupled to the second end of the light guide to receive the guided light, such that a modified divergence of the light provided by the light divergence modifier—at the output aperture of the light divergence modifier—is larger than the divergence of the guided light; and
an optical extractor optically coupled to the output aperture of the light divergence modifier, the optical extractor configured to output into the ambient environment light provided by the light divergence modifier as output light in one or more output angular ranges.

2. The illumination device of claim 1, wherein the light divergence modifier comprises a pair of opposing side surfaces extending along a length of the light divergence modifier between the input aperture and the output aperture.

3. The illumination device of claim 2, wherein at least one of the opposing side surfaces is planar.

4. The illumination device of claim 3, wherein both of the opposing side surfaces are planar.

5. The illumination device of claim 1, wherein the light divergence modifier comprises a truncated conical shaped surface extending between the input aperture and the output aperture.

6. An illumination device comprising:
a plurality of light-emitting elements (LEEs), wherein the LEEs are LEDs that emit white light;
a light guide having a pair of opposing surfaces extending in a forward direction from a first end of the light guide to a second end of the light guide, the light guide being positioned to receive at the first end light emitted by the LEEs and configured to guide the light to the second end, wherein divergence of the light received at the first end and divergence of the guided light that reaches the second end are substantially the same;
a light divergence modifier having an input aperture and an output aperture, the input aperture of the light divergence modifier being optically coupled to the second end of the light guide to receive the guided light, wherein the light divergence modifier comprises a 3D grating extending along a length of the light divergence modifier, the 3D grating configured such that a modified divergence of the light provided by the light divergence modifier—at the output aperture of the light divergence modifier—is one of either smaller or larger than the divergence of the guided light; and
an optical extractor optically coupled to the output aperture of the light divergence modifier, the optical extractor configured to output into the ambient environment light provided by the light divergence modifier as output light in one or more output angular ranges.

7. The illumination device of claim 6, wherein the length of the light divergence modifier is a fraction of a length of the light guide.

8. The illumination device of claim 7, wherein the fraction is between 5% and 50%.

9. The illumination device of claim 6, wherein the 3D grating comprises one or more of a holographic element and a photonic crystal.

10. The illumination device of claim 6, wherein the light guide, the light divergence modifier and the optical extractor are integrally formed or bonded together.

11. An illumination device comprising:
a plurality of light-emitting elements (LEEs), wherein the LEEs are LEDs that emit white light;
a light guide having a pair of opposing surfaces extending in a forward direction from a first end of the light guide to a second end of the light guide, the light guide being positioned to receive at the first end light emitted by the LEEs and configured to guide the light to the second end, wherein divergence of the light received at the first end and divergence of the guided light that reaches the second end are substantially the same;
an optical extractor; and
a light divergence modifier sandwiched between and optically coupled with the second end of the light guide and with the optical extractor to
receive the guided light and modify the divergence of the guided light, and
provide to the optical extractor light with a modified divergence,
wherein the light divergence modifier comprises one of either a convergent lens configured such that the modified divergence of the light provided to the optical extractor is smaller than the divergence of the guided light or a divergent lens configured such that the modified divergence of the light provided to the optical extractor is larger than the divergence of the guided light, and wherein the optical extractor is configured to output into the ambient environment light provided by the light divergence modifier as output light in one or more output angular ranges.

12. The illumination device of claim 11, wherein the lens is a Fresnel lens.

13. The illumination device of claim 11, wherein an index of refraction associated with the lens is different from an index of refraction associated with the light guide and an index of refraction associated with the optical extractor.

14. An illumination device comprising:
a plurality of light-emitting elements (LEEs), wherein the LEEs are LEDs that emit white light;
a light guide having a pair of opposing surfaces extending in a forward direction from a first end of the light guide to a second end of the light guide, the light guide being positioned to receive at the first end light emitted by the LEEs and configured to guide the light to the second end, wherein divergence of the light received at the first end and divergence of the guided light that reaches the second end are substantially the same;
an optical extractor; and
a light divergence modifier formed at an optical interface between the second end of the light guide and the optical extractor to
    receive the guided light and modify the divergence of the guided light, and
    provide to the optical extractor light with a modified divergence,
wherein the optical interface of the light guide and the optical extractor comprises a 2D grating, such that the modified divergence of the light transmitted through the optical interface of the light guide and the optical extractor to the optical extractor is one of either smaller or larger than the divergence of the guided light, and
wherein the optical extractor is configured to output into the ambient environment light provided by the light divergence modifier as output light in one or more output angular ranges.

15. The illumination device of claim 14, wherein the light guide is configured to guide the light received at the first end in the forward direction through total internal reflection (TIR) off the opposing side surfaces.

16. The illumination device of claim 14 extends orthogonally to the forward direction.

17. The illumination device of claim 16, wherein the LEEs are arranged orthogonally to the forward direction.

18. An illumination device comprising:
a plurality of light-emitting elements (LEEs);
one or more optical couplers;
a light guide having a pair of opposing surfaces extending in a forward direction from a first end of the light guide to a second end of the light guide, the light guide being positioned to receive at the first end light provided by the LEEs with a first divergence, wherein
    the optical couplers are arranged to receive the light provided by the LEEs and redirect it to the receiving end of the light guide with a second divergence, and
    a numerical aperture of the light guide is such that the light received from the optical couplers with the second divergence is guided by the light guide through TIR off the pair of opposing side surfaces such that the second divergence of the light received at the first end and divergence of the guided light that reaches the second end are substantially the same;
a light divergence modifier optically coupled to the light guide at the second end to receive the guided light, the light divergence modifier configured to modify the divergence of the guided light, such that the light provided by the light divergence modifier has a modified divergence different from the divergence of the guided light; and
an optical extractor optically coupled to the light divergence modifier, the optical extractor configured to output into the ambient environment light provided by the light divergence modifier as output light in one or more output angular ranges.

19. The illumination device of claim 18, wherein the optical extractor comprises
a first redirecting surface adapted to reflect at least a portion of the light provided by the light divergence modifier in a first direction that has a component orthogonal to the forward direction, and
a second redirecting surface adapted to reflect at least a portion of the light provided by the light divergence modifier in a second direction that has a component orthogonal to the forward direction and antiparallel to the orthogonal component of the first direction.

20. The illumination device of claim 19, wherein
the optical extractor comprises a first curved output surface and a second curved output surface positioned in a path of the light reflected from the first redirecting surface and in a path of the light reflected from the second redirecting surface, and
the first curved output surface and the second curved output surface are configured to transmit light incident thereon to the ambient environment in one or more backward angular ranges.

21. The illumination device of claim 18 extends orthogonally to the forward direction.

* * * * *